United States Patent
Parsons et al.

(10) Patent No.: US 6,934,976 B2
(45) Date of Patent: Aug. 30, 2005

(54) TOILET FLUSHER WITH NOVEL VALVES AND CONTROLS

(75) Inventors: Natan E. Parsons, Brookline, MA (US); Fatih Guler, Winchester, MA (US); Kay Herbert, Winthrop, MA (US); David Hadley, Franklin, MA (US); Robert Shamitz, Brighton, MA (US)

(73) Assignee: Arichell Technologies, Inc., West Newton, MA (US)

( * ) Notice: Subject to any disclaimer, the term of this patent is extended or adjusted under 35 U.S.C. 154(b) by 0 days.

(21) Appl. No.: 10/441,151

(22) Filed: May 19, 2003

(65) Prior Publication Data

US 2004/0025238 A1 Feb. 12, 2004

Related U.S. Application Data

(63) Continuation of application No. PCT/US01/43273, filed on Nov. 20, 2001, which is a continuation-in-part of application No. 09/957,761, filed on Sep. 21, 2001, now Pat. No. 6,425,145, and a continuation-in-part of application No. PCT/US01/11384, filed on Apr. 6, 2001, and a continuation-in-part of application No. 09/761,408, filed on Jan. 16, 2001, now Pat. No. 6,453,479, and a continuation-in-part of application No. 09/761,533, filed on Jan. 16, 2001, now Pat. No. 6,370,707, and a continuation-in-part of application No. 09/716,870, filed on Nov. 20, 2000, now Pat. No. 6,321,395.

(51) Int. Cl.[7] .............................................. E03D 1/34
(52) U.S. Cl. .................................... 4/378; 4/367; 251/29
(58) Field of Search ............................ 4/354, 362, 366, 4/367, 378, 379, 388, 405, 407, 413

(56) References Cited

U.S. PATENT DOCUMENTS

| | | | |
|---|---|---|---|
| 2,182,873 A | 12/1939 | King | 137/484.2 |
| 2,320,886 A | 6/1943 | Quiroz | 137/505.2 |
| 2,389,413 A | 11/1945 | Carlton | 137/12 |
| 2,760,204 A | 8/1956 | Joanis | 4/367 |
| 2,858,546 A | 11/1958 | Tekenos et al. | 4/313 |

(Continued)

FOREIGN PATENT DOCUMENTS

| | | |
|---|---|---|
| EP | 312750 | 4/1991 |
| EP | 0828103 | 3/1998 |
| GB | 447056 | 5/1936 |
| GB | 1332995 | 10/1973 |
| GB | 2277108 | 10/1994 |
| GB | 2277750 | 11/1994 |
| GB | 2329452 | 3/1999 |
| WO | WO 98/06910 | 2/1998 |
| WO | WO 98/10209 | 3/1998 |

Primary Examiner—Justine R. Yu
Assistant Examiner—Huyen Le
(74) Attorney, Agent, or Firm—Ivan D. Zitkovsky

(57) ABSTRACT

A tank-type flusher includes an intake valve, i.e., a fill valve, a diaphragm-operated flush valve, and a pressure control mechanism. The intake valve is connected to an external water source and is constructed to close water flow to a water storage tank at about a predefined water level in the water tank. The diaphragm-operated flush valve is constructed to control a flush valve member between a seated state and an unseated state allowing water discharge from the water tank into a toilet bowl. There is a diaphragm, separating a flush-valve chamber and a pilot chamber, arranged to seal the flush-valve chamber and thereby maintain pressure forcing the flush valve member to the seated state preventing the water discharge from the water storage tank to the toilet bowl. The pressure control mechanism is constructed and arranged, upon actuation, to reduce pressure in the pilot chamber of the diaphragm-operated flush valve to cause deformation of the diaphragm and thereby reduce pressure in the flush-valve chamber causing the water discharge.

26 Claims, 24 Drawing Sheets

U.S. PATENT DOCUMENTS

| | | | |
|---|---|---|---|
| 3,064,675 A | 11/1962 | Johnson et al. | 137/489.5 |
| 3,113,756 A | 12/1963 | Griffo | 251/57 |
| 3,628,195 A | 12/1971 | Skousgaard | 4/354 |
| 3,677,294 A | 7/1972 | Gibbs et al. | 137/572 |
| 3,689,025 A | 9/1972 | Kiser | 251/25 |
| 3,747,621 A | 7/1973 | Tine | 137/218 |
| 3,817,279 A | 6/1974 | Larson | 137/572 |
| 3,817,489 A | 6/1974 | Caron et al. | 251/38 |
| 3,820,171 A | 6/1974 | Larson | 4/360 |
| 3,820,754 A | 6/1974 | Caron et al. | 251/38 |
| 3,905,050 A | 9/1975 | Goza et al. | 4/358 |
| 4,003,399 A | 1/1977 | Fischer | 4/353 |
| 4,034,423 A | 7/1977 | Milnes | 4/366 |
| 4,060,857 A | 12/1977 | Couton | 4/362 |
| 4,077,602 A | 3/1978 | Klessig | 251/25 |
| 4,088,297 A | 5/1978 | Doyle et al. | 251/44 |
| 4,141,091 A | 2/1979 | Pulvari | 4/313 |
| 4,193,145 A | 3/1980 | Gross et al. | 4/346 |
| 4,233,698 A | 11/1980 | Martin | 4/354 |
| 4,304,015 A | 12/1981 | Hubatka | 4/407 |
| 4,357,720 A | 11/1982 | Stahli | 4/378 |
| 4,499,615 A | 2/1985 | Radovsky | 4/366 |
| 4,575,880 A | 3/1986 | Burgess | 4/313 |
| 4,646,780 A | 3/1987 | Spooner | 4/353 |
| 4,662,395 A | 5/1987 | Strangfeld | 4/354 |
| 4,707,868 A | 11/1987 | Hennessy | 4/354 |
| 4,756,031 A | 7/1988 | Barrett | 4/407 |
| 4,832,310 A | 5/1989 | Nestich | 251/36 |
| 4,941,215 A | 7/1990 | Liu | 4/406 |
| 5,003,643 A | 4/1991 | Chung | 4/313 |
| 5,005,226 A | 4/1991 | Basile et al. | 4/354 |
| 5,046,201 A | 9/1991 | Steinhardt et al. | 4/354 |
| 5,187,818 A | 2/1993 | Barrett, Sr. et al. | 4/313 |
| 5,313,673 A | 5/1994 | Sandi et al. | 4/313 |
| 5,335,694 A | 8/1994 | Whiteside | 137/625.37 |
| 5,341,839 A | 8/1994 | Kobayashi et al. | 137/505.13 |
| 5,361,426 A | 11/1994 | Martin | 4/361 |
| 5,400,446 A | 3/1995 | Bloemer et al. | 4/408 |
| 5,427,351 A | 6/1995 | Korfgen et al. | 251/39 |
| 5,431,181 A | 7/1995 | Saadi et al. | 137/15.11 |
| 5,435,019 A | 7/1995 | Badders | 4/354 |
| 5,464,037 A | 11/1995 | Younes | 137/410 |
| 5,603,127 A | 2/1997 | Veal | 4/246.1 |
| 5,649,686 A | 7/1997 | Wilson | 251/40 |
| 5,652,970 A | 8/1997 | Wodeslavsky | 4/378 |
| 5,722,454 A | 3/1998 | Smith et al. | 137/503 |
| 5,802,628 A | 9/1998 | Spoeth et al. | 4/359 |
| 5,857,661 A | 1/1999 | Amada et al. | 251/57 |
| 5,884,667 A | 3/1999 | North | 138/43 |
| 5,920,919 A | 7/1999 | Chang | |
| 5,970,527 A | 10/1999 | Martin et al. | 4/361 |
| 6,123,315 A | 9/2000 | Keller | 251/41 |
| 6,263,519 B1 | 7/2001 | Parsons et al. | 4/313 |
| 6,321,395 B1 * | 11/2001 | Parsons et al. | 4/378 |
| 6,370,707 B1 * | 4/2002 | Parsons et al. | 4/379 |
| 6,453,479 B1 * | 9/2002 | Parsons et al. | 4/378 |

\* cited by examiner

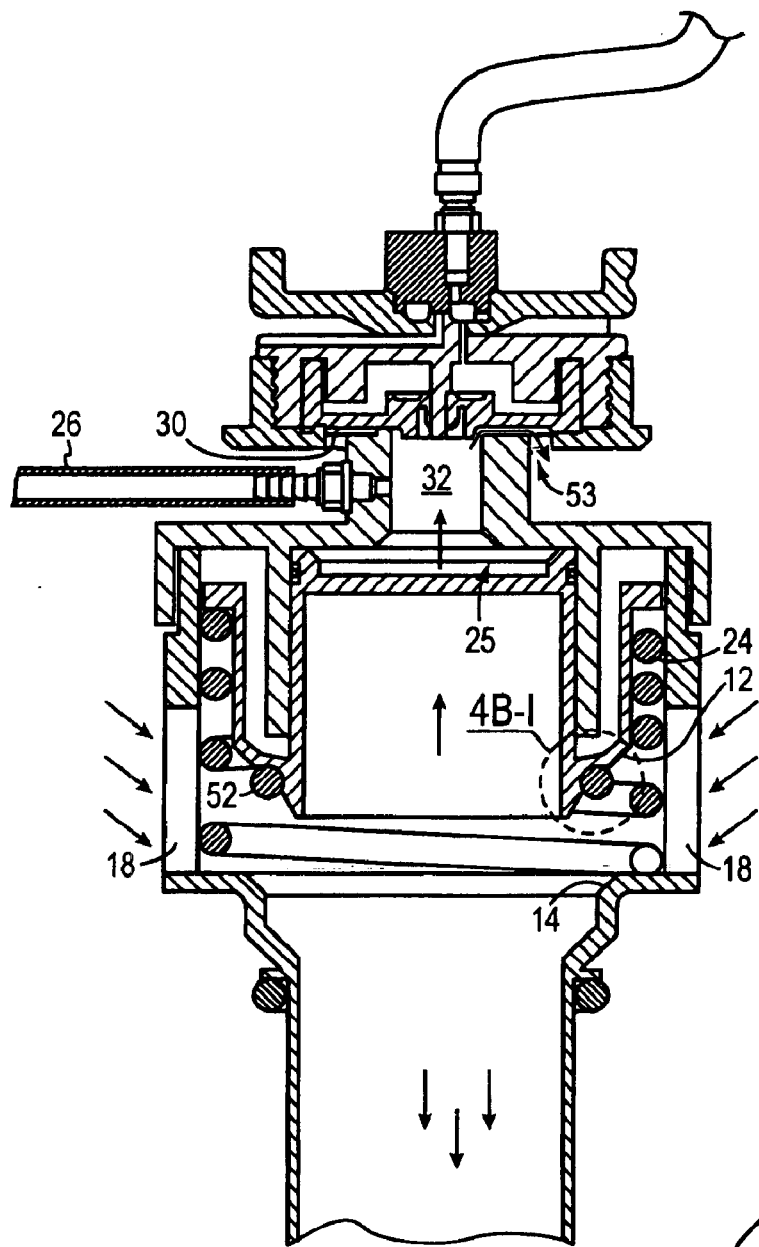
FIG. 4B
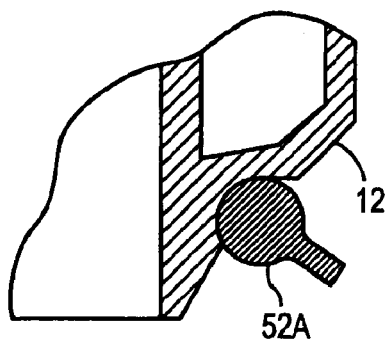
FIG. 4B-I

TOILET FLUSHER WITH NOVEL VALVES AND CONTROLS

This application is a continuation of PCT Application PCT/US01/43273, filed Nov. 20, 2001, which is a continuation-in-part of U.S. application Ser. No. 09/716,870, entitled "Timed Fluid-Linked Flush Controller," filed on Nov. 20, 2000 now U.S. Pat. No. 6,321,395; and is a continuation-in-part of U.S. application Ser. No. 09/761,408, entitled "Flusher Having Consistent Flush-Valve-Closure Pressure," filed on Jan. 16, 2001 now U.S. Pat. No. 6,453,479; and is a continuation-in-part of U.S. application Ser. No. 09/761,533, entitled "Supply-Line-Sealed Flush Controller," filed on Jan. 16, 2001 now U.S. Pat. No. 6,370,707; and is a continuation-in-part of PCT Application PCT/US01/11384, entitled "Automatic Tank-Type Flusher," filed on Apr. 6, 2001; and is a continuation-in-part of U.S. application Ser. No. 09/957,761 entitled "Push Button For Metered Flow," filed on Sept. 21, 2001 now U.S. Pat. No. 6,425,145.

BACKGROUND OF THE INVENTION

1. Field of the Invention

The present invention is directed to toilet flushing. It finds particular, although not exclusive, application in automatic tank-type flushers.

2. Background Information

The art of toilet flushers is an old and mature one. (We use the term toilet here in its broad sense, encompassing what are variously referred to as toilets, water closets, urinals, etc.) While many innovations and refinements in this art have resulted in a broad range of approaches, flush systems can still be divided into two general types. The first is the gravity type, which is used in most American domestic applications. The gravity type uses the pressure resulting from water stored in a tank to flush the bowl and provide the siphoning action by which the bowl's contents are drawn from it. The second type is the pressurized flusher, which uses line pressure more or less directly to perform flushing.

Some pressure-type flushers are of the tank type. Such flushers employ pressure tanks to which the main water-inlet conduit communicates. Water from the main inlet conduit fills the pressure tank to the point at which air in the tank reaches the main-conduit static pressure. When the system flushes, the water is driven from the tank at a pressure that is initially equal to that static pressure, without reduction by the main conduit's flow resistance. Other pressure-type flushers use no pressure tank, and the main conduit's flow resistance therefore reduces the initial flush pressure.

While flush-mechanism triggering has historically been performed manually, there is also a long history of interest in automatic operation. Particularly in the last couple of decades, moreover, this interest has resulted in many practical installations that have obtained the cleanliness and other benefits that automatic operation affords. As a consequence, a considerable effort has been expended in providing flush mechanisms that are well adapted to automatic operation. Automatic operation is well known in pressure-type flushers of the non-tank variety, but gravity-type flushers and pressurized flushers of the tank variety have also been adapted to automatic operation.

European Patent Publication EPO 0 828 103 A1 illustrates a typical gravity arrangement. The flush-valve member is biased to a closed position, in which it prevents water in the tank from flowing to the bowl. A piston in the valve members shaft is disposed in a cylinder. A pilot valve controls communication between the main (pressurized) water source and the cylinder. When the toilet is to be flushed, only the small amount of energy required for pilot-valve operation is expended. The resultant opening of the pilot valve admits line pressure into the cylinder. That pressure exerts a relatively large force against the piston and thereby opens the valve against bias-spring force. Pilot valves have similarly been employed to adapt pressure-type flushers to automatic operation.

SUMMARY OF THE INVENTION

According to another aspect, a tank-type flusher includes an intake valve (i.e., a fill valve), a diaphragm-operated flush valve, and a pressure control mechanism. The intake valve is connected to an external water source and is constructed to close water flow to a water storage tank at about a predefined water level in the water tank. The diaphragm-operated flush valve is constructed to control a flush valve member between a seated state and an unseated state allowing water discharge from the water tank into a toilet bowl. There is a diaphragm, separating a flush-valve chamber and a pilot chamber, arranged to seal the flush-valve chamber and thereby maintain pressure forcing the flush valve member to the seated state preventing the water discharge from the water storage tank to the toilet bowl. The pressure control mechanism is constructed and arranged, upon actuation, to reduce pressure in the pilot chamber of the diaphragm-operated flush valve to cause deformation of the diaphragm and thereby reduce pressure in the flush-valve chamber causing the water discharge.

Preferred embodiments of this aspect include one or more of the following features: The intake valve includes a float constructed and arranged without any fixed coupling to any valve member. The intake valve includes a float arranged to freely float within a float cage and to block a relief orifice at the predefined water level.

The pressure control mechanism is controlled by a solenoid. The flush valve member is constructed to move linearly within a flush valve housing. The flush-valve chamber is arranged to receive water pressure from the external source and to prevent the water discharge utilizing at least a portion of the water pressure.

According to another aspect, a tank-type flusher includes an intake valve (i.e., a fill valve), and a diaphragm-operated flush valve. The intake valve is constructed to close water flow from an external water source to a water storage tank when there is a predefined water level in the water tank. The intake valve includes a float constructed and arranged to freely float within a float cage. The diaphragm-operated flush valve includes a flush-valve chamber, wherein the diaphragm-operated flush valve is constructed to open upon actuation to discharge water into a toilet bowl from the water tank.

According to yet another aspect, a tank-type flusher includes an intake valve, and a diaphragm-operated flush valve. The intake valve is connected to an external water source and is constructed to close water flow to a water storage tank at about a predefined water level in the water tank. The flush valve is constructed to control position of a flush valve member movable between a seated state and an unseated state allowing water discharge from the water tank into a toilet bowl, wherein the flush valve member is biased to the unseated state by a bias member and is forced to the seated state by at least a portion of water pressure from the external source.

Preferred embodiments of this aspect include one or more of the following features: The intake valve and the flush valve are located within a single housing. The flush-valve chamber is arranged to receive water pressure from the external source and is arranged to prevent the water discharge utilizing at least a portion of the water pressure.

The diaphragm-operated flush valve may be controlled by a solenoid. The water tank may be an exposed water tank or a concealed water tank located behind a wall. The intake valve enables a variable water level in the tank.

The tank-type flusher may include a vacuum breaker arranged to prevent transfer of water from the tank to a water supply.

The tank-type flusher may include a manual actuator constructed and arranged to actuate the flush valve. The manual actuator may be a push button actuator. The push button actuator is constructed to actuate the flush valve enabling a dual water volume flush. The push button actuator is constructed to actuate hydraulically the flush valve.

The tank-type flusher may include an automatic actuator constructed and arranged to actuate the flush valve. The automatic actuator is constructed to be triggered by a sensor. The sensor may register presence of an object or movement of an object. The sensor may be an optical sensor. The automatic actuator may be constructed to actuate the flush valve enabling a dual water volume flush. The automatic actuator may be located outside of the water tank and is constructed to actuate hydraulically the flush valve.

The tank-type flusher may include a check valve arranged to reduce variation of closing pressure depending on water line pressure. The tank-type flusher may include a pressure compensated flow regulator. The tank-type flusher may include a viper seal co-operatively arranged with the flush valve to prevent water leaking into the toilet bowl. The tank-type flusher may include a vent for controlling odor.

We have invented novel gravity-type and pressure-type flush mechanisms. In the case of the gravity-type flush valve, we have recognized that operation can be made more repeatable by simply employing a configuration that is the reverse of the one described in the above-mentioned European patent publication. Specifically, we bias our flush valve to its unseated state, in which it permits flow from the tank to the bowl, and we use line pressure to hold the flush valve shut rather than to open it. We have recognized that this approach makes it very simple to have a repeatable valve-opening profile. Also, high line pressure actually aids in preventing leakage through the flush valve, rather than tending to reduce the effectiveness of the flush-valve seal. Since the toilet's suction generation is principally dependent on that profile, and since our approach makes the bias mechanism essentially the sole determinant of that profile, our approach enables this aspect of flush operation to be largely independent of line pressure.

We have also recognized that pressure-type flush systems adapted for automatic operation can be simplified by providing a pressure-relief passage that extends through the flush-valve member itself. Specifically, part or the entire valve member is disposed in a pressure chamber, into which line pressure is admitted. This pressure overcomes a bias force and holds the valve member in its seated position, in which it prevents flow from the pressurized-liquid source into the bowl. To open the flush valve, it is necessary to relieve the pressure in the pressure chamber by venting it into some unpressurized space. Rather than follow the conventional approach of providing an additional pressure-relief exit from the flush mechanism, we use the flush outlet for pressure relief by providing a pressure-relief conduit that extends from the pressure chamber through the flush-valve member itself. A pressure-relief mechanism ordinarily prevents flow through this pressure-relief conduit, but it permits such flow when the toilet is to be flushed.

In both pressure- and gravity-type systems, much of the mechanism employed to operate the flush valve is typically local to the wet region. That is, it is inside the pressure vessel in the case of a pressure-type system, and it is in the tank below the high-water line in case of a gravity-type system. For automatic operation, though, at least some part, such as a lens used as part of an object sensor to collect light reflected from the object, is disposed at a remote location. So there is some communication between the local and remote regions. This communication may be totally hydraulic, wherein a pressure-relief line extends from the local region to a remote region outside the pressure vessel or outside the part of the tank interior. A remote valve controls a pressure-relief line for controlling the flush valve's operation. In this embodiment, there is no need for a sealed enclosure for the electrical components.

BRIEF DESCRIPTION OF THE DRAWINGS

FIG. 4B is a similar view of the gravity-type flush valve, but in its open state.

FIG. 6E is an isometric view of another button member from the push-button assembly of FIG. 6B FIG. 7 includes FIGS. 7A and 7B wherein

DETAILED DESCRIPTION OF ILLUSTRATIVE EMBODIMENTS

Figure 1:
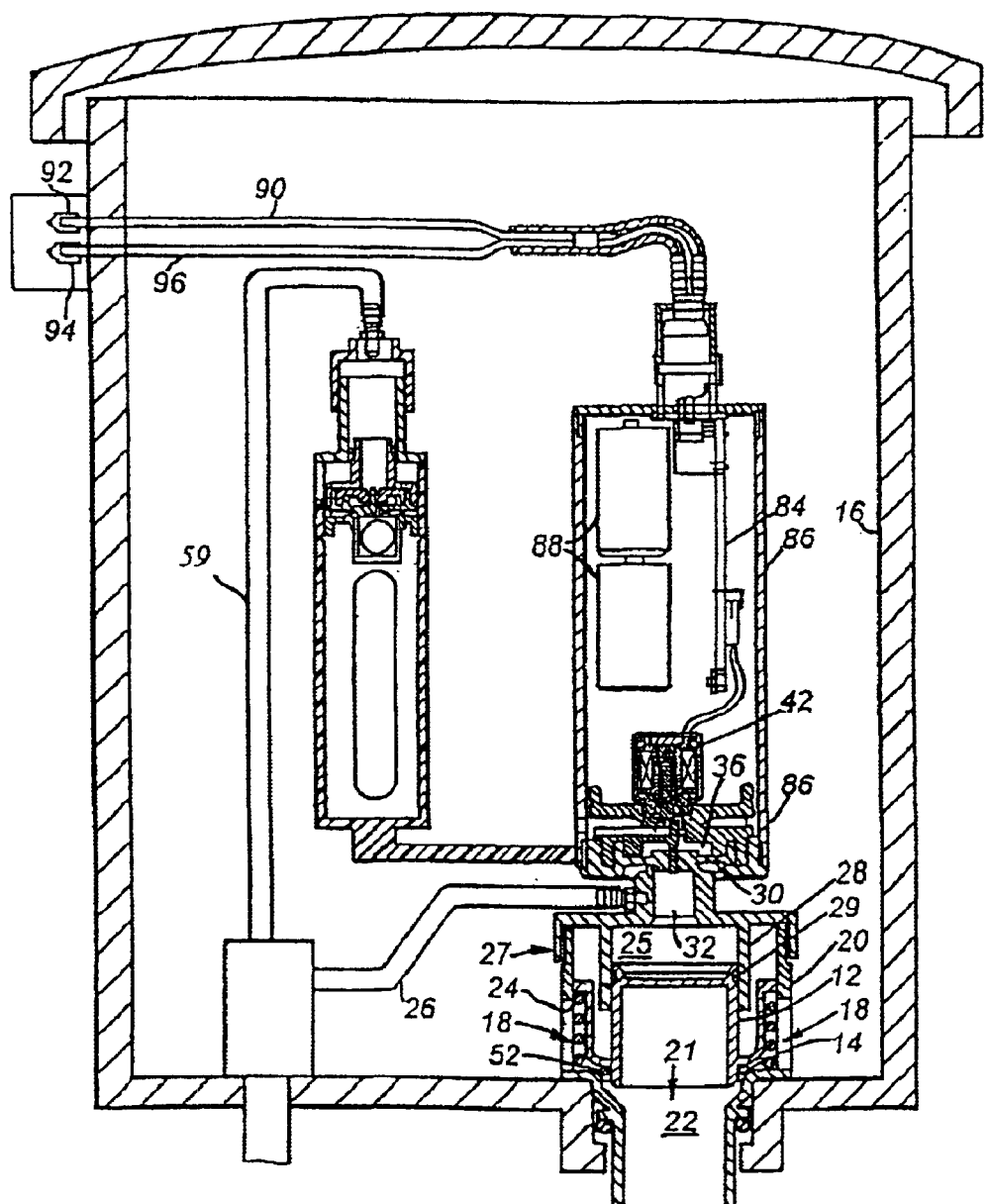
FIG. 1 is a sectional view of a toilet tank illustrating its float and gravity-type flush valves.
Figure 1A:
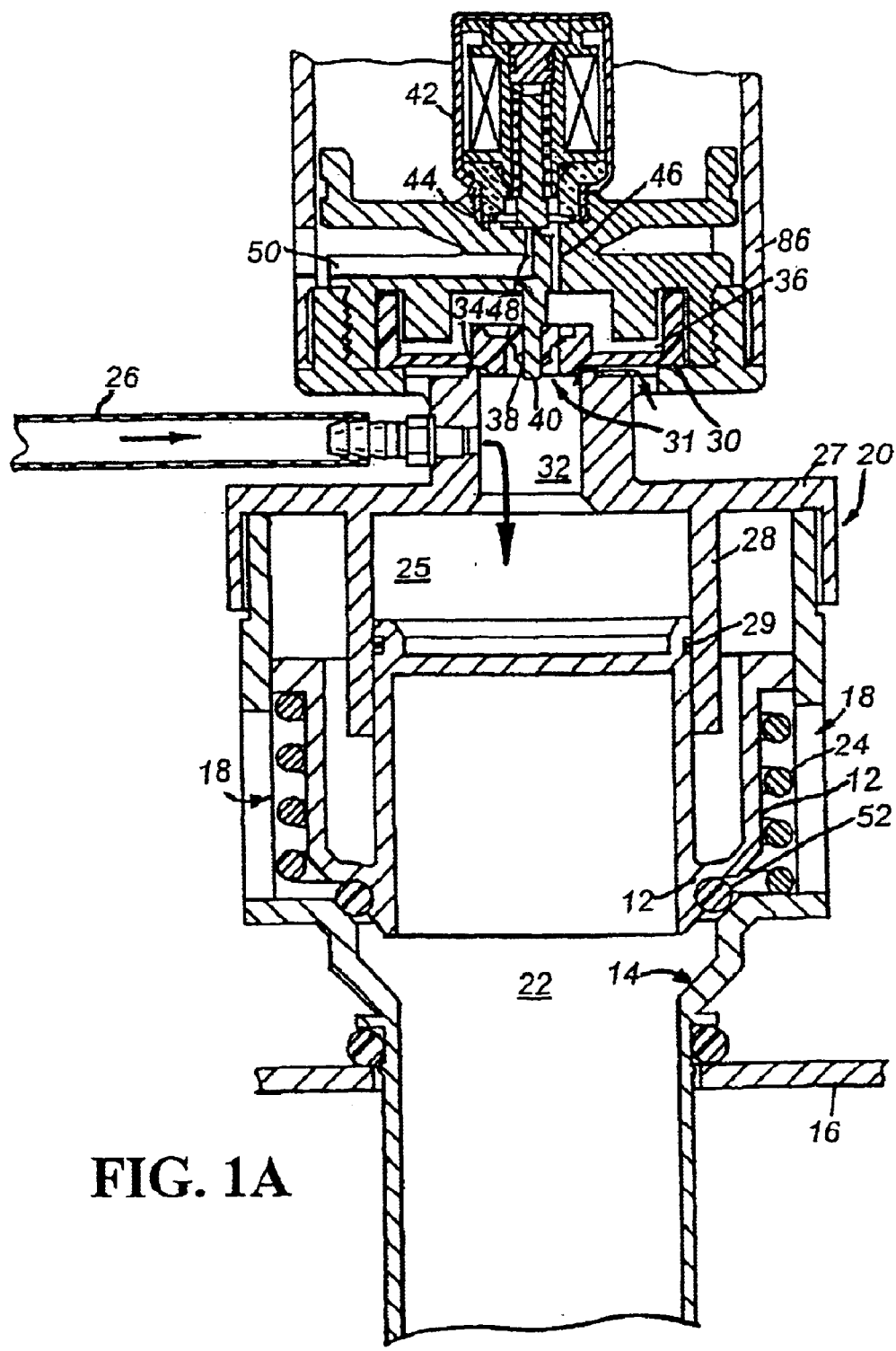
FIG. 1A is a more-detailed cross section of the gravity-type flush valve in its closed state.

Referring to FIG. 1, a gravity-type flush mechanism includes a fill valve mechanism 5 and a flush-valve mechanism 10 located in a toilet tank 16. Toilet tank 16 is an exposed tank traditionally used in the US, or a concealed tank frequently used in the EU countries. FIG. 1A shows flush-valve mechanism 10 in a closed state wherein flush-valve member 12 is seated in a flush-valve seat 14 formed in the bottom of toilet tank 16. In that seated position, the valve member 12 prevents water from the tank 16 that has entered through flush ports 18 in a flush-valve housing 20 from flowing through a flush outlet 21 and a flush conduit 22 to a toilet.

The flush mechanism includes a bias spring 24, which exerts a force that tends to urge flush-valve member 12 off its seat 14. That is, flush-valve member 12 is biased to an unsealed state but remains seated between flushes due to water line pressure. This pressure that normally prevails in a flush-valve (or piston) chamber 25 because of its communication with a (pressurized-) water source conduit 26. The flush-valve housing 20's cap 27 provides this chamber, and the flush-valve member is slidable within a cylinder 28 that the cap forms.

Figure 1B:
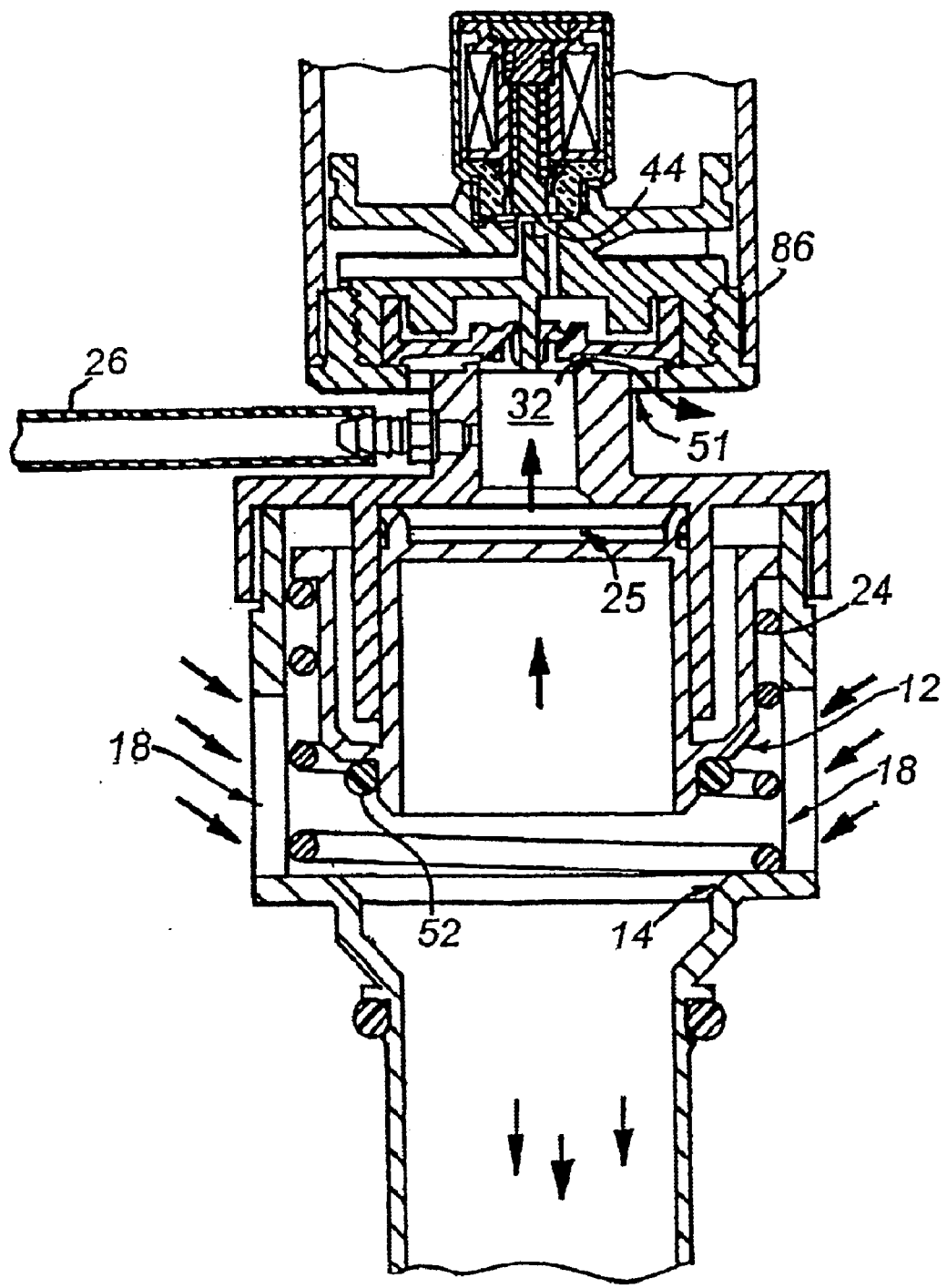
FIG. 1B is a similar view of the gravity-type flush valve, but in its open state.

Referring to FIGS. 1A and 1B, operation of flush valve mechanism 10 is controlled by pressure in chamber 25 using a pilot valve diaphragm 30. The valve member's seal ring 29 cooperates with diaphragm 30 to prevent escape of the pressurized water from piston chamber 25 through a pressure-relief outlet 31 in chamber 25's narrowed passage portion 32. Diaphragm 30 is resiliently deformable so pressure within passage 32 tends to lift it from engagement with a pilot-valve seat 34 and a similar pressure within a pilot chamber 36 acts on diaphragm 30 in the opposite direction over a greater area. There is a small orifice 38 through which a pilot-valve pin 40 extends, and orifice 38 permits water to bleed into it (through a relatively high flow resistance) to equalize the pressure. Due to a greater surface area of diaphragm 30 in chamber 36 there is a net force that keeps diaphragm 30 seated at seat 34.

To cause the system to flush, a solenoid 42 withdraws a second pilot-valve member 44 from a seat to enable flow through a passage 46 that leads from chamber 36 to a further passage 48 that leads to an outlet 50. The flow resistance through passages 46 and 48 is much lower than that through bleed orifice 38, so the pressure within chamber 36 drops. This pressure drop creates an opposite force due to pressure within passage 32 to raise diaphragm 30 off its seat, as FIG. 1B shows. Diaphragm 30 serves as a pressure-relief valve that lowers the water pressure within passage 32 (and thus within chamber 25) through a plurality of openings such as opening 51. As a consequence, the bias spring 24 can overcome the force exerted by the pressure within chamber 25. The flush-valve member 12 therefore rises, lifting its O-ring seal 52 off the main valve seat 14 and thereby allowing the tank to empty as shown in FIG. 1B.

Importantly, O-ring 52 may be replaced by a rubber or plastic seal having a viper-shaped blade. The viper-shaped blade is designed both to provide a seal on seat 14 and to clean or remove any deposits located on the surface of seat 14. The design and the action of the viper-shaped blade further helps in preventing water leaks.

Gravity flush mechanisms are used with toilets that operate by way of suction created when the rising liquid level in the bowl drives water to the turn in a vertical conduit bend, where the pull of gravity then draws fluid down the reverse bend to siphon bowl contents out. The effectiveness of the desired suction depends significantly on the profile of flush-valve movement as the flush valve opens. In the present embodiments, the flush valves have a repeatable opening-movement profile achieved by employing bias spring 24, which causes the valve-opening motion. This repeatable motion is then essentially independent of line pressure so long as the pressure-relief path has much less flow resistance than the path by which the chamber is repressurized.

Referring again to FIG. 1, after tank 16 is emptied, solenoid 42 seats valve member 44 to close flow in passages 46 and 48 again. At least when the system is battery-operated, it is preferable for the solenoid to be of the latching variety as described in U.S. Pat. No. 6,293,516 (but non-latching solenoid described in U.S. Pat. No. 6,305,662 may also be used). That is, it is preferable for the solenoid to require power to change state but not to require power to remain in either state to increase battery longevity. With valve member 44 seated, the pressure above diaphragm 30 can again build to equal that below it, so diaphragm 30 again seats to cause pressure in chamber 25 to produce enough force to close this main flush valve 12 again. As a result, flow from FIG. 1's main line 59 fills the tank through float-valve assembly 5 best seen in FIG. 1C.

Figure 1C:
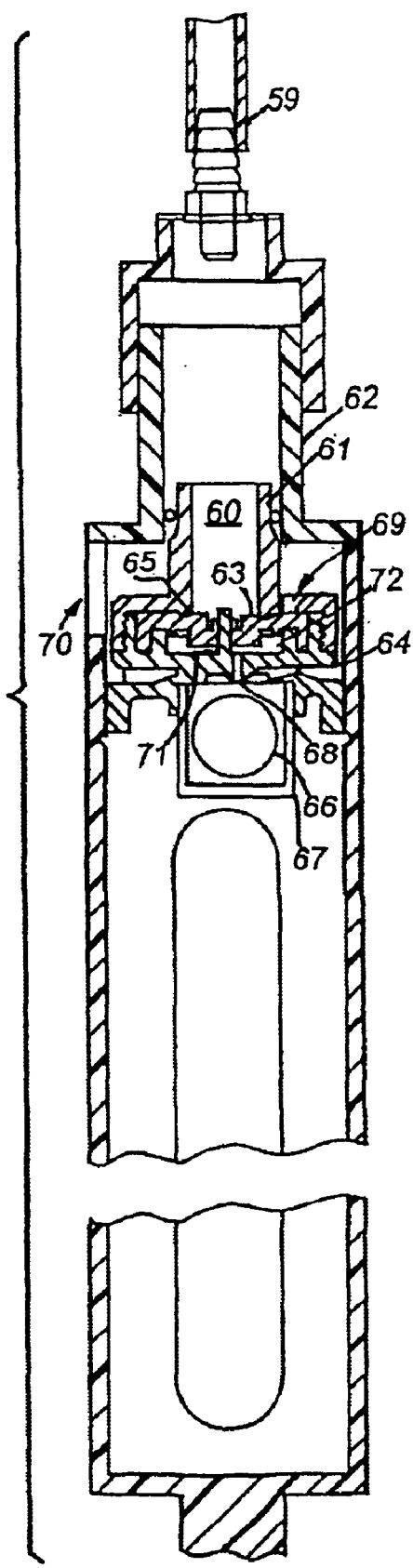
FIG. 1C is a cross-sectional view depicting FIG. 1's gravity-type flush valve in more detail.

Referring to FIG. 1C, float valve assembly 5 uses diaphragm 63 to control water filling tank 16. Specifically, water from line 59 flows through main valve passage 60 formed by a valve cap 61 sealingly secured in a float-valve frame 62. Fill-valve diaphragm 63 is held between valve cap 61 and a valve plug 64 threadedly secured to the valve cap 61 and also sealed to the float-valve frame 62. At rest, resilient diaphragm 63 seats against a valve seat 65 that valve cap 61 forms. Float valve assembly 5 also includes a ball float 66 freely floating in a float cage 67. So long as ball float 66 does not plug a pressure-relief orifice 68, the pressure within passage 60 causes such a deformation of the resilient diaphragm 63 as to leave a clearance between it and the valve seat 65. Thus, water from a passage 60 can flow around the valve seat 65 through a valve-cap opening 69 and openings 70 in the float-valve frame 62.

The height of pressure relief orifice 68 is designed (or selected) to close the fill valve at a predefined water level. The resultant rising water in tank 16 eventually lifts float 66 into a position in which it blocks pressure-relief orifice 68. This prevents the escape of water that has bled through a high-flow-resistance orifice 71 into a chamber 72 formed by diaphragm 63 with valve plug 64. Thus, the pressure within that chamber approaches that within passage 60. Moreover, that pressure acts on the diaphragm 63's lower surface over a greater area than the same pressure does on the diaphragm's upper surface. The resultant upward force presses diaphragm 63 against its seat 65 and prevents further flow from the high-pressure line 59 into the tank. In the illustrated embodiment, the water level at which this occurs can be adjusted by adjusting the height within frame 62 of cap 61, plug 64, and parts connected to them.

A user can trigger a solenoid cycle manually by, for instance, using a push button. Alternatively, the solenoid operates automatically in response to sensed user activity. For instance, a control circuit 84 mounted in a water-tight enclosure 86 and powered by batteries 88 provides the solenoid drive current. To determine when to drive the solenoid, control circuit 84 (FIG. 1) generates and transmits infrared light through optic fibers 90 to a lens 92 and thereby irradiates a target region. Another lens 94 collects light that a target has reflected, and optic fibers 96 conduct that light to a detector in control circuit 84. Typically, control circuit 84 assumes an "armed" state when a target is detected. From that armed state, the subsequent absence of a target will, possibly after some delay, result in the solenoid's causing the flush valve to open and close in the manner described above.

Figure 1D:
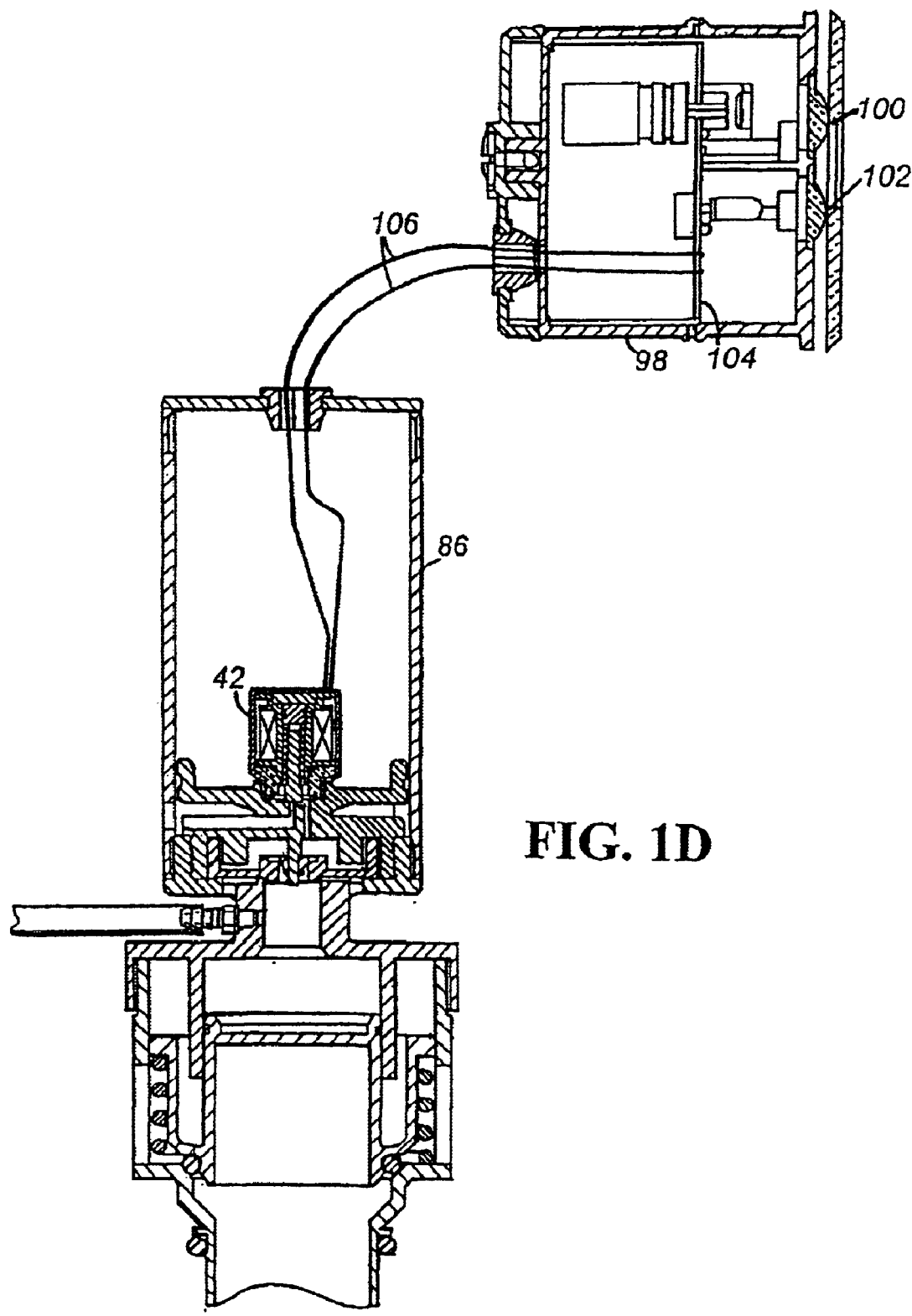
FIG. 1D is a cross-sectional view of an alternative flush-valve arrangement, in which solenoid-control circuitry is located remotely from a solenoid located in the flush-valve assembly.

FIG. 1D illustrates an embodiment of a tank type flusher having a solenoid control circuitry mounted on the tank. For example, an electronics enclosure 98 may be mounted on the tank wall, above the tank's high-water line. Lenses 100 and 102 have the same functions as those shown in FIG. 1's. In the FIG. 1 arrangement, the object-sensor lenses are disposed at the tank's exterior; all of the control circuitry is disposed inside the tank and inside a water-tight enclosure disposed below the tank's high-water level. Lenses 92 and 94 can be mounted in the same enclosure as control circuitry 104 so there is no need for optic fibers to connect the lenses to the control circuitry. However, the control circuitry is now remote from solenoid 42, which remains in the watertight enclosure 86. Operator wires 106 lead from control circuit 104 to solenoid 42 to enable the control circuit to operate solenoid 42.

An alternative, wireless approach would be a hybrid of the approaches that FIGS. 1 and 1D illustrate. Push-button or sensing circuitry in such an approach would be located remotely, as in FIG. 1D, but the solenoid-drive circuitry would be local, as in FIG. 1. The remote circuitry would additionally include a wireless transmitter, and the local circuitry would include a wireless receiver responsive to the transmitter. For example, the transmitter and receiver may communicate by way of low-frequency—say, 125 kHz—electromagnetic waves. Such electro-magnetic waves may be modulated by pulse trains so encoded as to minimize the effects of spurious reception from other sources. It may be preferable in wireless approaches for at least the local receiver to be located above the water line, but this is not required.

Figure 2:
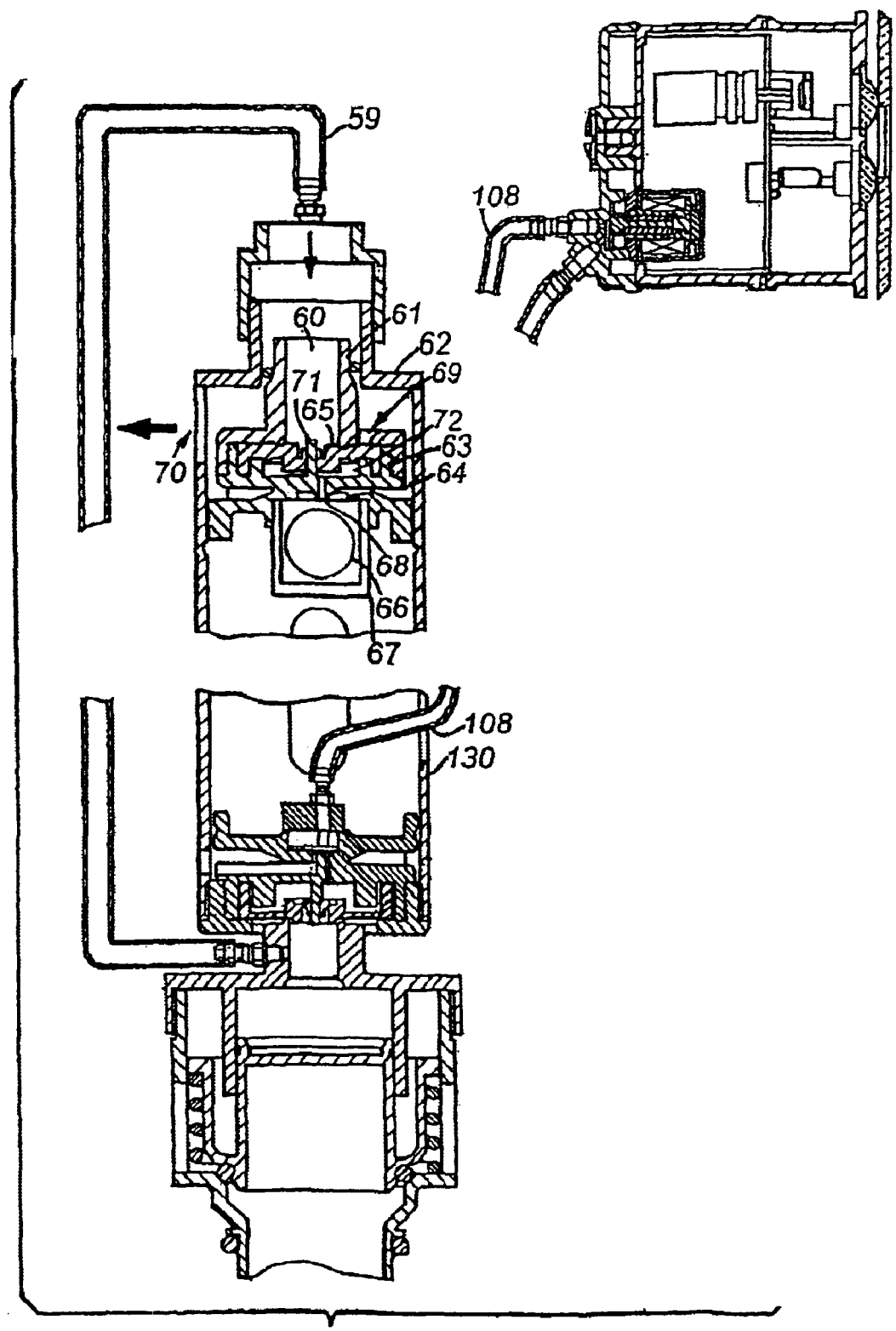
FIG. 2 is a cross-sectional view that illustrates an embodiment in which the float- and flush-valve assemblies share common elements.
Figure 2A:
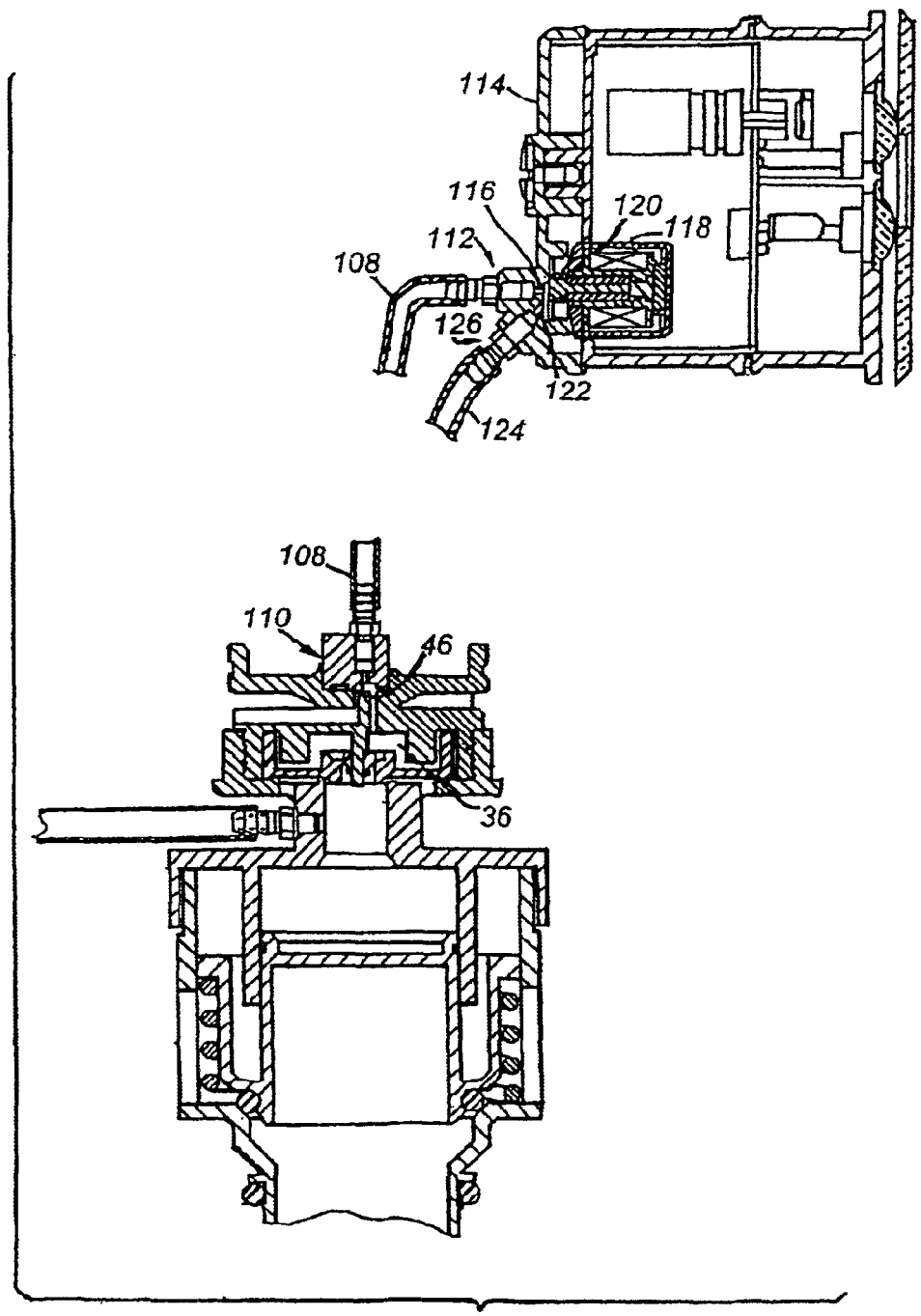
FIG. 2A is a cross-sectional view of another embodiment, one in which the solenoid as well as the solenoid-control circuitry is located remotely from the flush-valve assembly.

Whereas the FIG. 1D arrangement employs the operator wires 106 to couple the remote control elements to the local ones, FIGS. 2 and 2A illustrate an arrangement in which diaphragm 30 is controlled by a hydraulic line 108 (or a pneumatic line). In the embodiment of FIG. 2A, the passage 46 by which the pilot valve's upper chamber 36 is relieved communicates through an appropriate fitting 110 with the hydraulic line 108. Another fitting 112 on a control-circuit housing 114 places the hydraulic line 108 into communication with a valve passage 116 through which a solenoid 118 controls the flow.

In one state, solenoid 118 holds a valve member 120 in the position in which it prevents flow from passage 116 to a further passage 122. The pressure in the pilot valve's upper chamber 36 would otherwise be exhausted to the tank interior by way of an exhaust hose 124 secured to another fitting 126 on the control-circuit housing 114. Exhaust hose 124 is provided for those installations in which the control-circuit housing 114 is disposed outside the tank; such installations would need an exhaust hose to return water to the tank. If the housing 114 is instead mounted inside the tank (above the high-water line), such an exhaust hose is unnecessary.

In the embodiment of FIG. 1 float-valve assembly 5 is provided separately from flush-valve assembly 10. Alternatively, the embodiment of FIG. 2 has the float- and flush-valve assemblies located in a single unit. Frame 130 is mounted on the float-valve pilot assembly just as watertight enclosure 86 of FIG. 1. Hydraulic line 108 provides communication with the remote elements, so frame 130 does not need to provide watertight protection to any local elements. Frame 130 serves the same function as FIG. 1C's float-valve frame 62. In other embodiments where it is necessary to protect local elements from water in the tank, frame 130 can be arranged to provide watertight protection.

Figure 3:
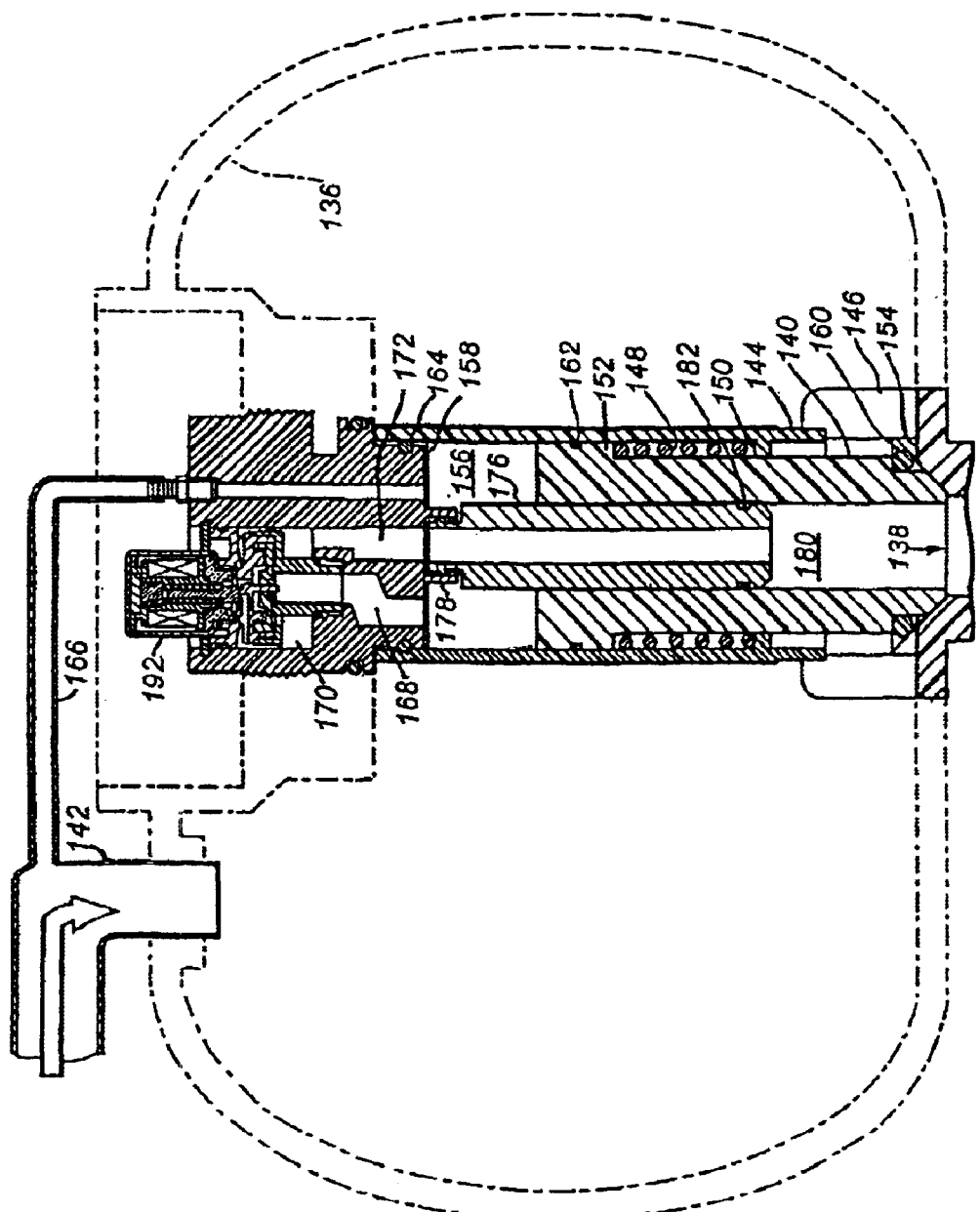
FIG. 3 is a cross-sectional view of a pressure-type embodiment.
Figure 3A:
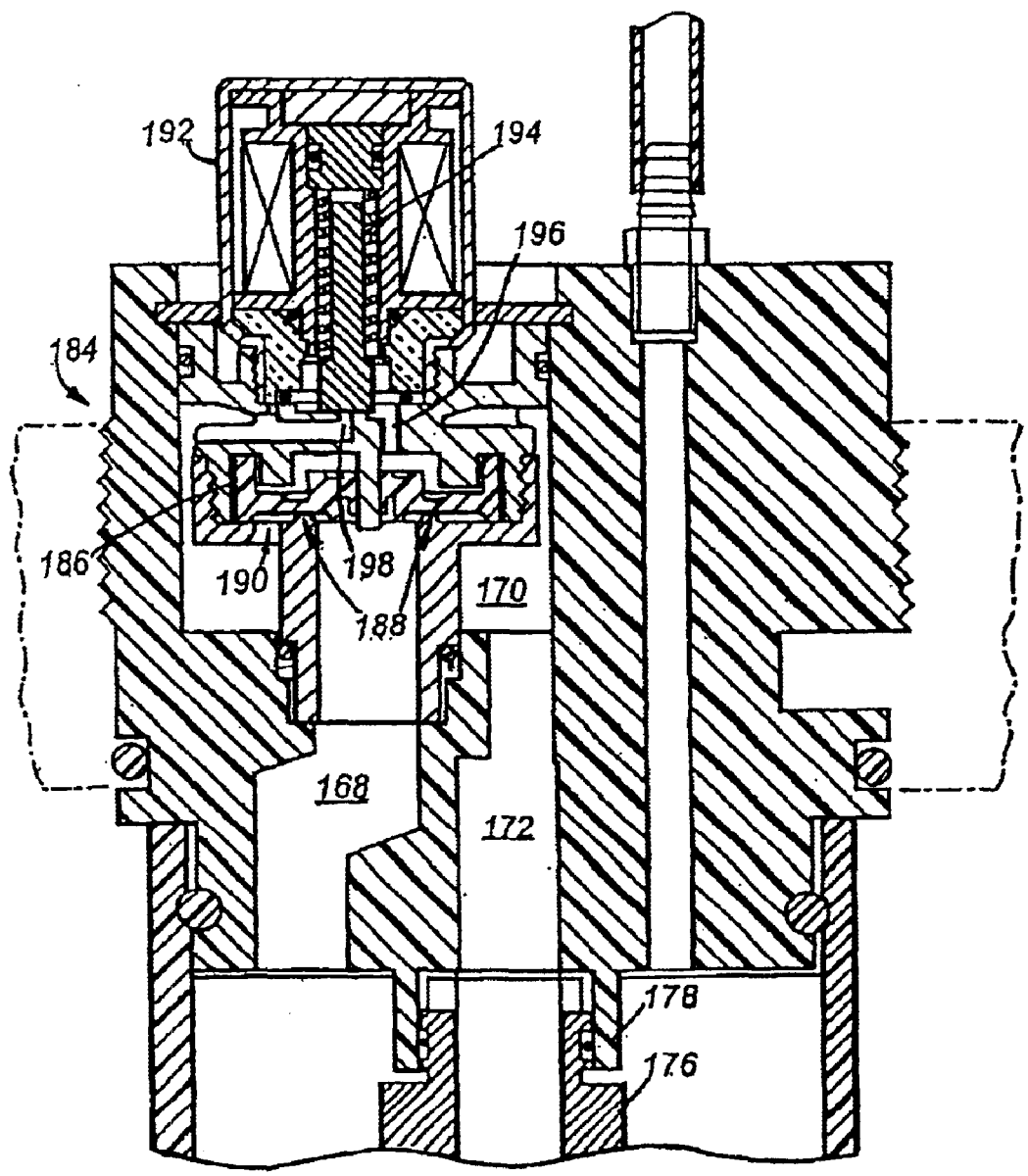
FIG. 3A is a more-detailed cross-sectional view of a pilot-valve for the pressure type embodiment.

According to another embodiment, FIG. 3 illustrates a pressure-type flusher 135 of the tank variety. Pressure-type flusher 135 includes a pressure vessel 136, a flush valve assembly and a fill valve assembly. Pressure vessel 136 is always under pressure introduced from main pressure line 142. A flush-valve member 140 controls flow from flush valve outlet 138 into the toilet bowl. Flush-valve member 140 is moveable within a cylinder 144 supported by fins 146 that extend upward from the base of the pressure vessel 136. A bias spring 148 acting between a ledge 150 provided by cylinder 144 and a piston head 152 formed by valve member 140 tends to lift valve member 140 off its seat 154. The pressure in a chamber 156 formed by cylinder 144 between piston head 152 and a cap 158 keeps the flush-valve member 140 in the illustrated position, in which it squeezes an O-ring seal 160 against the valve seat 154. Seals 162 on the piston head and 164 on the cap help to prevent the escape from the chamber 156 of pressurized water that has been introduced into it by way of an input pressure line 166.

To cause the mechanism to flush, pressure in chamber 156 is relieved by way of a pressure-relief conduit comprising a pilot-valve inlet passage 168, a pilot-valve outlet chamber 170, guide-tube inlet passage 172, a guide tube 176 secured to the cap 158 by a collar 178 that the cap forms, and a bore 180, formed by the flush-valve member 140, that receives the guide tube 176. Seals 182 on the guide tube prevent escape of fluid from chamber 156.

A pressure-relief valve 184 operates similarly to pilot valves previously described to control flow through the pressure-relief conduit just described. Specifically, fluid from the pilot-valve inlet passage 168 is ordinarily prevented by diaphragm 186 from flowing around an annular valve seat 188 though valve-cap openings 190 into the pilot-valve outlet chamber 170. When the pressure-relief mechanism's solenoid 192 raises a valve member 194 so as to relieve the pressure above diaphragm 186 through passages 196 and 198, pressure below the diaphragm 186 lifts it off the valve seat 188 and permits relief of chamber 156's pressure through the pressure vessel 136's flush opening 138. By thus relieving the chamber pressure through the valve member itself, the illustrated flush mechanism avoids the need for a separate passage to the pressure-vessel exterior.

The pressure type flusher of FIG. 3 includes control circuitry for controlling solenoid 192 located locally.

According to another embodiment, solenoid 192 may be provided remotely, in a manner similar to that depicted in FIG. 2A. The pressure-relief passage could include conduits that are similar to FIG. 2A's hoses 108 and 124 but communicate with the embodiment of FIG. 3 passages 196 and 198.

Figure 4:
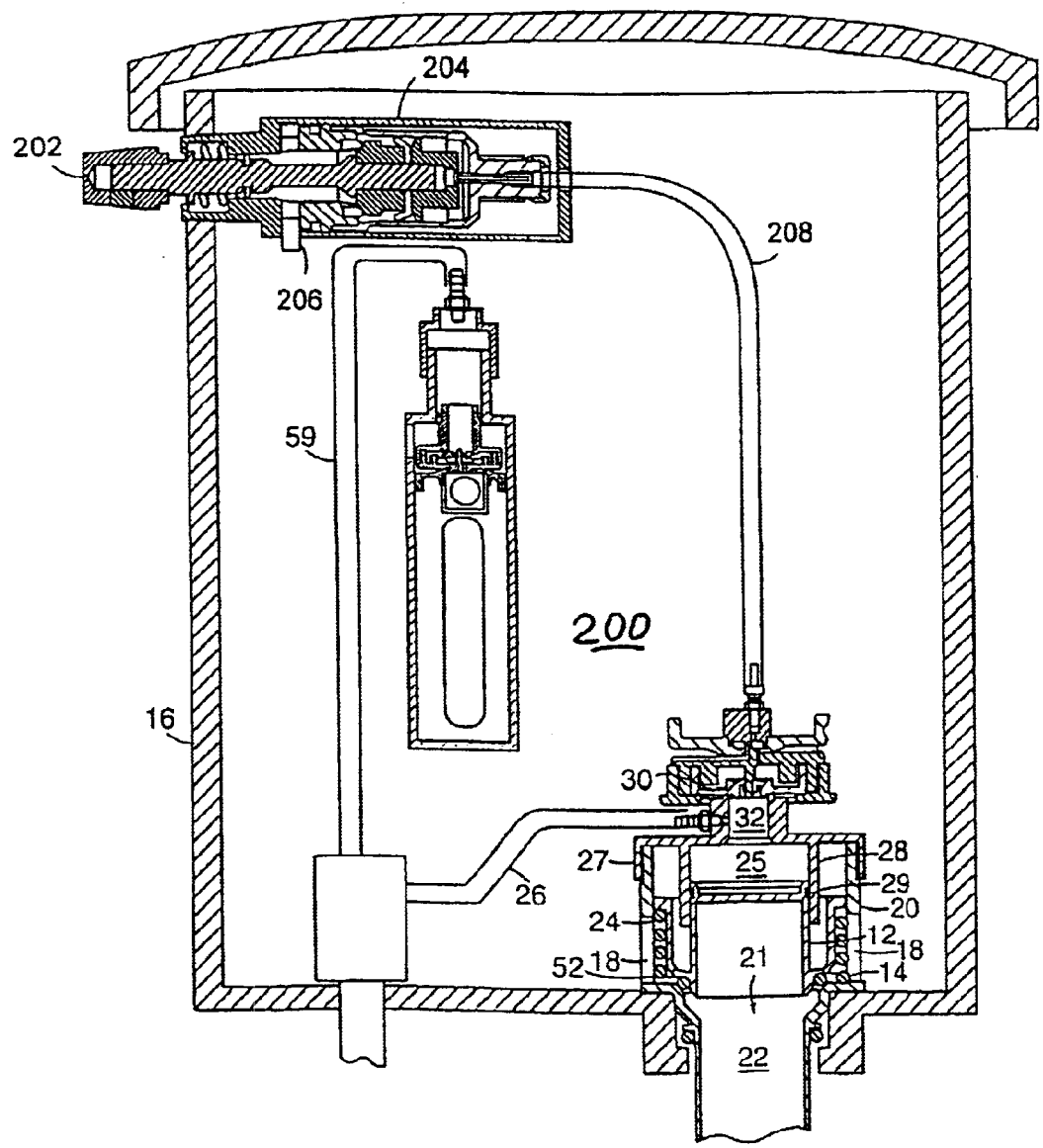
FIG. 4 is a sectional view of a toilet tank illustrating its float and gravity-type flush valves.

FIG. 4 illustrates another embodiment of a gravity-type flush-valve system 200. Similarly as shown in FIGS. 1A and 1B, gravity-type flush valve system 200 includes flush valve member 12 seated in flush-valve seat 14 formed in the bottom of toilet tank 16. In the seated position, the valve member 12 prevents water in tank 16 that has entered through flush ports 18 in flush-valve housing 20 from flowing through flush outlet 21 and flush conduit 22 to a toilet.

Figure 4A:
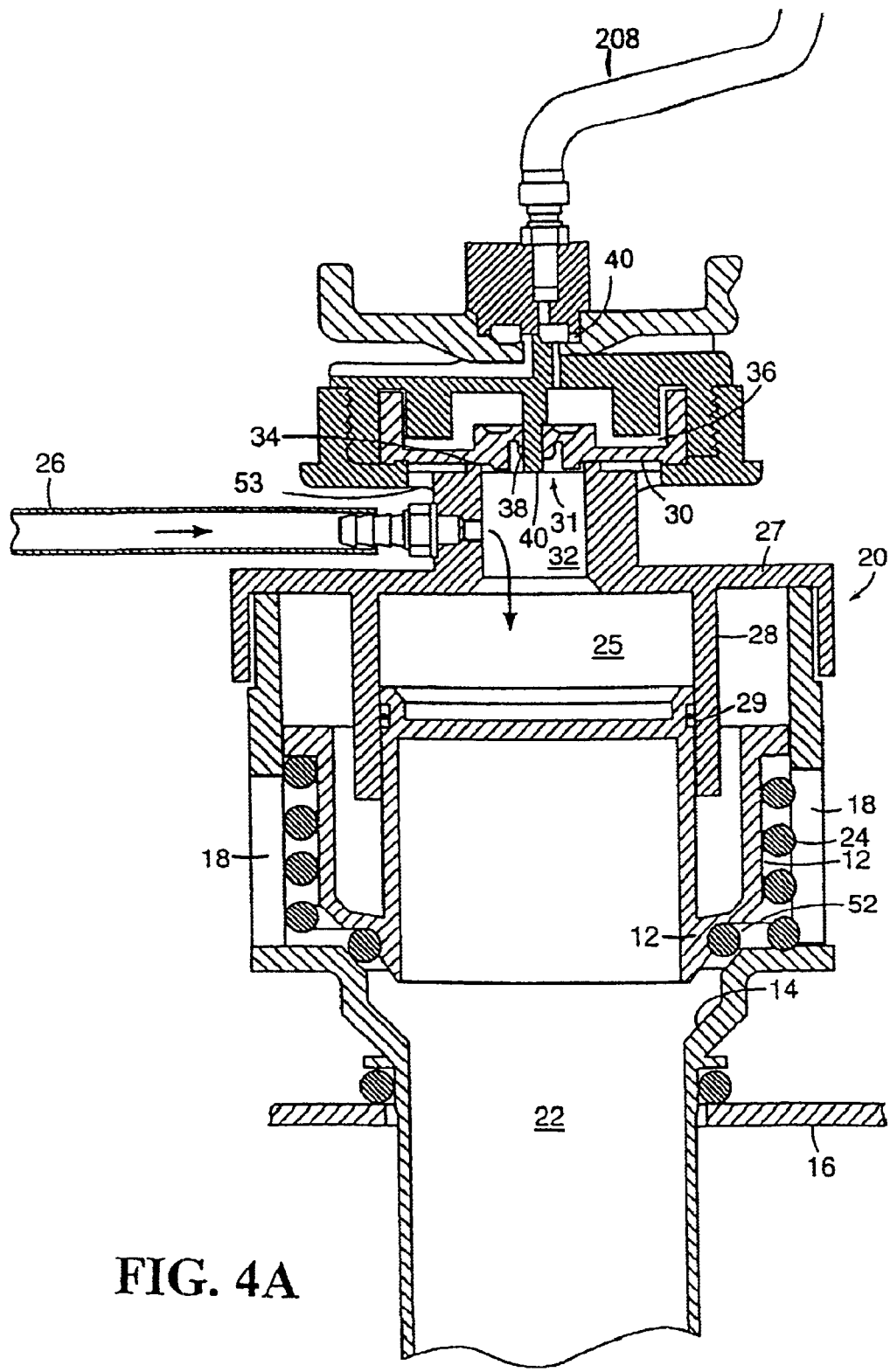
FIG. 4A is a more-detailed cross section of the gravity-flush valve in its closed state.

As FIG. 4A shows, the flush mechanism includes bias spring 24. Bias spring 24 exerts a force that tends to urge flush-valve member 12 off its seat 14. But pressure that normally prevails in chamber 25 because of its communication with pressurized- water source conduit 26 keeps the flush-valve member seated between flushes. The flush-valve housing 20's cap 27 provides this chamber, and the flush-valve member is slideable within a cylinder 28 that the cap forms.

The valve member's seal ring 29 cooperates with a pilot-valve diaphragm 30 to prevent escape of the pressurized water from the piston chamber 25 through a pressure-relief outlet 31 in chamber 25's narrowed passage portion 32. The pilot-valve diaphragm 30 is resiliently deformable, so the pressure that prevails within passage 32 would tend to lift it from engagement with the pilot-valve seat 34 if a similar pressure did not prevail within pilot chamber 36 and act on the diaphragm 30 over a greater area. The reason why this pressure prevails within chamber 36 is that a small orifice 38 through which pilot-valve pin 40 extends permits water to bleed into it (through a relatively high flow resistance).

In this embodiment, O-ring 52 may again be replaced by a rubber, polymer or plastic seal having a wiper-shaped blade 52A shown in FIG. 4B–I. The wiper-shaped blade is designed both to provide a seal on seat 14 and to clean or remove any deposits located on the surface of seat 14. The design and the action of the wiper-shaped blade further helps in preventing water leaks.

To cause the system to flush, the user depresses FIG. 4's push button 202. As will be explained in more detail below, this causes a remote pressure-relief valve 204 to permit flow to its outlet 206 from a pressure-relief tube 208 that communicates with pilot chamber 36 through passages 49 (FIG. 4A). This relieves pressure in chamber 36. The flow resistance through that path is much lower than the bleed orifice 38's flow resistance, so the pressure within chamber 36 drops and permits that within passage 32 to raise diaphragm 30 off its seat, as FIG. 4B shows. Diaphragm 30 serves as a pressure-relief valve. Specifically, it permits the pressure within the passage 32 and thus within chamber 25 to be relieved through a plurality of openings such as opening 53. As a consequence, bias spring 24 can overcome the force exerted by the pressure within chamber 25. Flush-valve member 12 (FIG. 4) therefore rises, lifting its O-ring seal 52 off the main valve seat 14 and thereby allowing the tank to empty.

After the tank empties, remote valve 44 closes, as will be explained below in more detail, to prevent any further flow out of chamber 36. The pressure above diaphragm 30 can therefore again build to equal that below it, so diaphragm 30 again seats to cause pressure in chamber 25 to produce enough force to close the main flush valve 12 again. As a result, flow from main line 59 fills the tank through a float-valve assembly best seen in FIG. 4. Specifically, as described above, water from line 59 flows through main valve passage 60 formed by a valve cap 61 sealingly secured in a float-valve frame 62 (FIG. 1C).

Referring to FIG. 1C, at rest, resilient diaphragm 63 seats against a valve seat 65 that the valve cap 61 forms. At low water level, the pressure within passage 60 causes such a deformation of the resilient diaphragm 63 as to leave a clearance between it and the valve seat 65. Thus, water from passage 60 can flow around the valve seat 65 through a valve-cap opening 69 and openings 70 in the float-valve frame 62. The rising water in the tank eventually lifts the float 66 into a position in which it blocks the pressure-relief orifice 68. This prevents the escape of water that has bled through a high-flow-resistance orifice 71 into a chamber 72 that the diaphragm 63 forms with the valve plug 64. Then, the pressure within that chamber approaches that within the passage 60. Moreover, that pressure acts on the diaphragm 63's lower surface over a greater area than the same pressure does on the diaphragm's upper surface. The resultant upward force presses the diaphragm 63 against its seat 65 and prevents further flow from the high-pressure line 59 into the tank.

Figure 5:
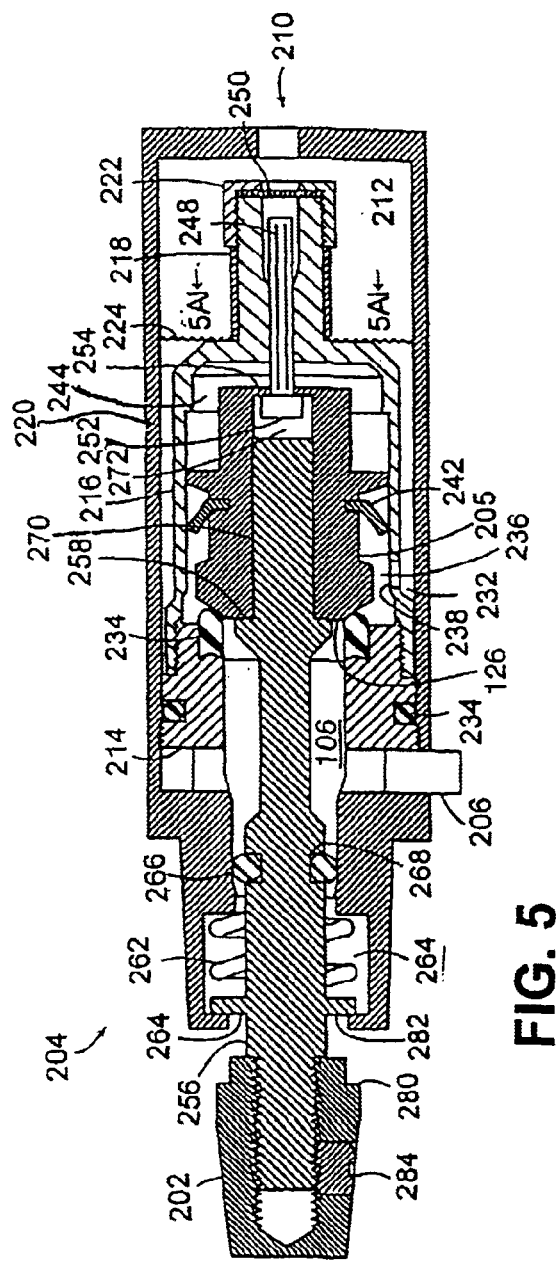
FIG. 5 is a cross-sectional view of the push-button valve of FIG. 4.

Referring to FIG. 5, remote valve 204 includes a movable valve member 205 actuated by button 202, for releasing pressure in tube 208. The relief tube 208 terminates in a valve inlet 210 and communicates with a main-valve entrance chamber 212. Cooperating threads on a seal frame 214 and a valve core 216 secure the latter to the former, which in turn is threadedly secured to the housing 220's interior. A net 222 threadedly secured to the end of the valve core 216 bears against a washer 218 that holds a screen 224 in place. By flowing through the screen, water from the entrance chamber 212 can enter an annular space 232 sealed by an O-ring 235 that seal frame 214 holds in place against housing 220's inner surface.

A lip seal 234 mounted on seal frame 214 acts as a valve seat. In the illustrated, closed valve state a movable valve member 205 seats against that lip seal. When the valve is thus closed, a second lip seal 242 mounted on the valve member 205 cooperates with lip seal 234 to prevent water from flowing from an outlet-passage entrance chamber 236, with which a core port 238 provides annular space 232 communication, through an annular outlet passage 240 and out the valve outlet port 206.

Figure 5A:
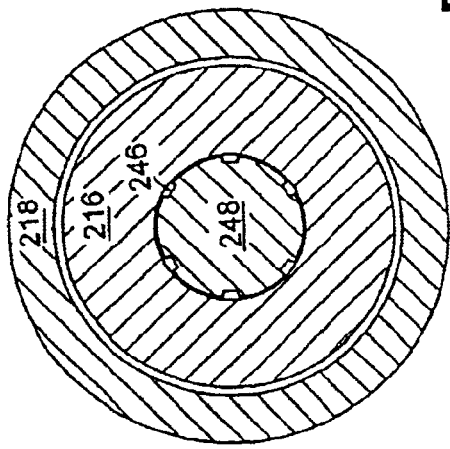
FIG. 5A is a cross-sectional view taken at line 5A—5A in FIG. 5.

The resultant pressure in the outlet-passage entrance chamber 236 exerts a force against the lower lip seal 242 that would tend to unseat the valve member 205, but the valve member remains seated because equal pressure in another, seating-pressure chamber 244 acts over a greater area and thereby exerts a greater, countervailing force. Pressure prevails in that seating-pressure chamber because, as FIG. 5A illustrates, the valve core forms a pin passage 246 in which a fluted core pin 248 is disposed to form a high-flow-resistance flow path from main valve entrance chamber 212 through a further screen 250 into the seating-pressure chamber 244. Acting against the core pin's enlarged head 252, an internal lip 254 retains the core pin.

The push button 202 is threadedly secured to an actuator rod 256 whose stop surface 258 bears against a valve-member shoulder 260 that acts as a stationary stop. When depressing button 202, the user overcomes the force of bias spring 262 located in a spring recess 264 formed by the valve housing 220. Spring 262 exerts return force on a collar 266 formed by the actuator rod.

When a user manually depresses push button 202, the actuator rod 256 bears against valve member 205, and the user overcomes fluid-flow resistance (explained below) and the force from the seating-pressure chamber 244 to displace the valve member 205 downward. This both unseats the valve member from the upper lip seal 234 and draws water out of the seating-pressure chamber 244 through passage 212. By unseating the valve, the user opens communication between the outlet-passage entrance chamber 236 and the outlet passage 240. That is, pressure in the pressure-relief tube is relieved through a valve flow path that includes the main entrance chamber 212, the annular space 232, core port 238, the annular outlet passage 240, and the main valve outlet port. An O-ring seal 266 mounted in an annular seal groove 268 that the actuator rod 256 forms prevents leakage through the spring recess 264.

Actuator rod 256 and valve member 205 are cooperatively constructed and arranged to relieve pressure in tube 208 and cause delay in pressure buildup after actuation. The actuator rod's end shaft 270 is slideable within the valve member's central passage 272, so the bias spring 262 can urge that actuator-rod's stop surface 258 out of engagement with the valve member 205 when the user releases the push button 202. The user usually releases the push button while most of the water has yet to drain from the flush tank. Therefore, there is a delay during which remote valve 204 remains open so that flush valve 205 also remains open. In remote valve 204, valve member 205's movement from its unseated position to its seated position increases the seating-pressure chamber's volume and thus necessitates flow into seating-pressure chamber 244 in order to return its pressure to the value that prevails at the inlet 210 and thus in the space 236 whose pressure tends to keep the valve member 205 unseated. However, the flow resistance of the passage 246 (FIG. 5A) by which that make-up must flow into the seating-pressure chamber 244 is so great that this flow causes a simplified pressure drop for several seconds. As a consequence, the force on the valve member 205 caused by the pressure within the seating-pressure chamber 244 is not great enough to overcome the force from space 236's pressure, so the valve member 205 remains unseated for that length of time.

The precise duration of the delay between the user's release if the push button 202 and the valve member's seating—and thus of the flush valve's closing—depends to a great extent on the difference between the seating-pressure chamber's volumes in the two states. This in turn depends on the travel permitted by the illustrated valve-closed distance between the push button 202's stop surface 280 and the housing's end lip 282. A setscrew 284 enables installation personnel to adjust that distance and thereby the length of time for which the flush valve is open. Therefore, remote valve 204 can vary flush duration by adjustably selecting the time flush valve 10 is opened.

Figure 6:
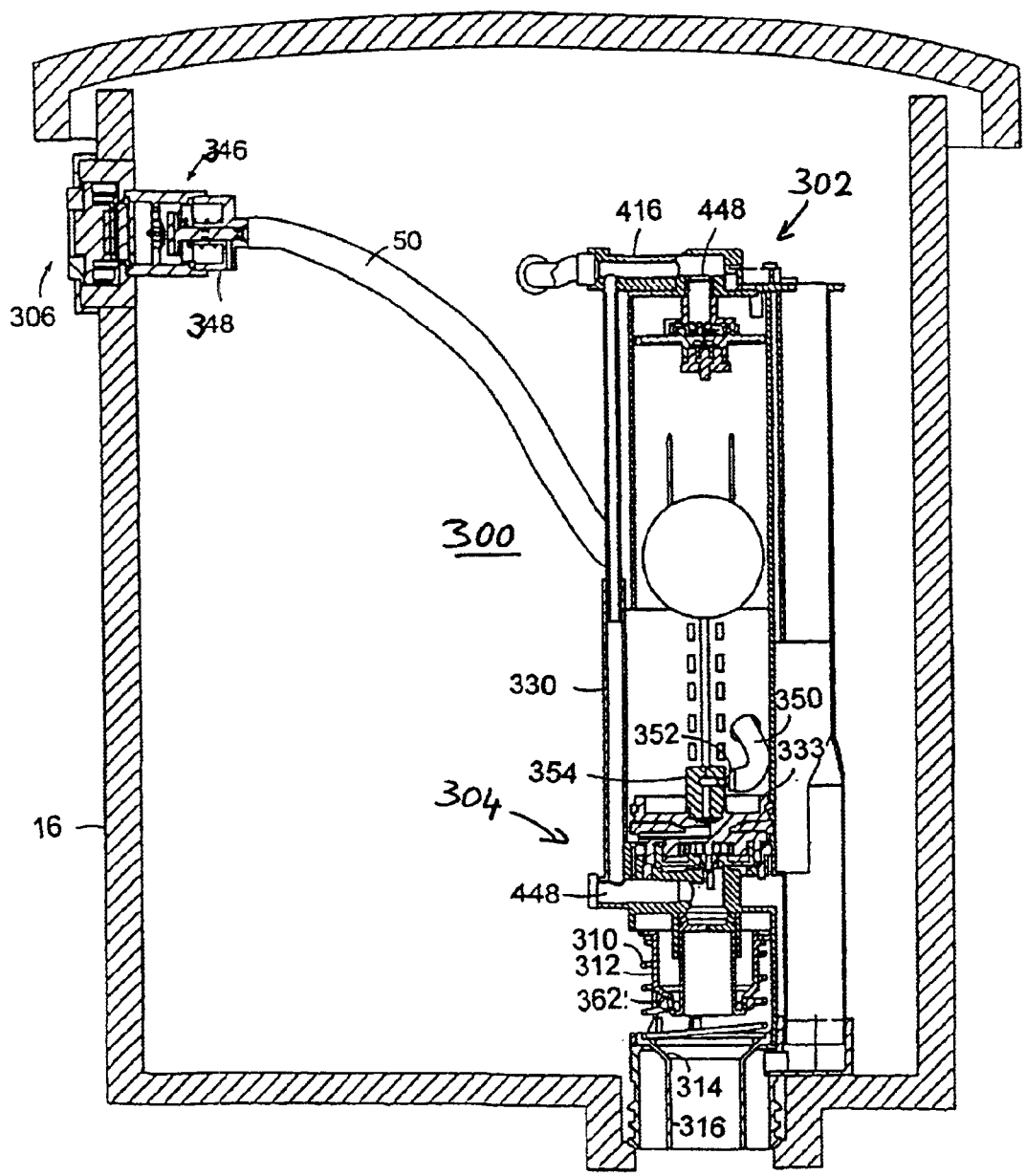
FIG. 6 is a sectional view of the toilet tank illustrating its float and gravity-type flush valves.
Figure 6A:
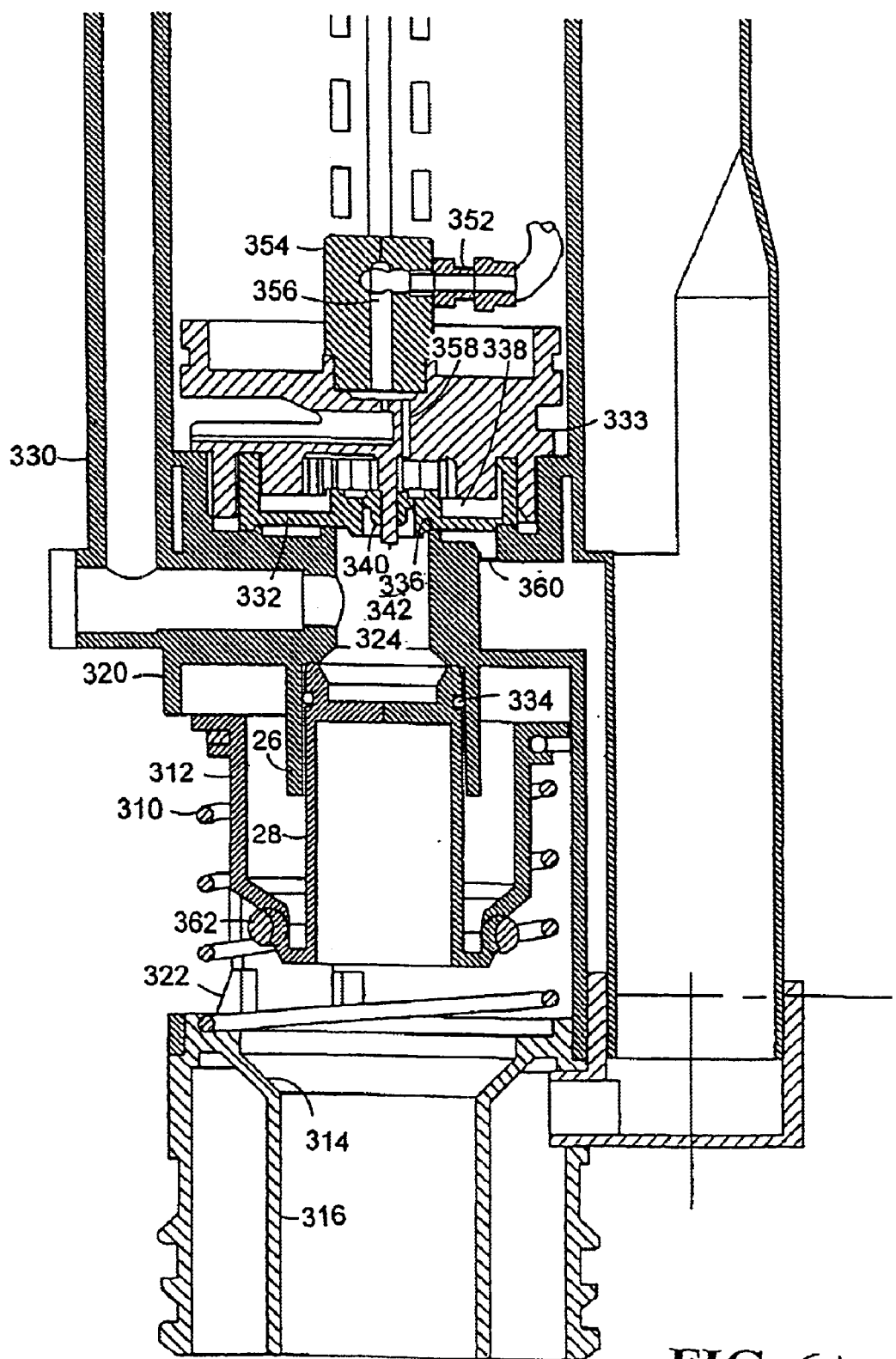
FIG. 6A is a more-detailed cross section of the flush-valve mechanism.

FIGS. 6 and 6A illustrate another embodiment of a gravity type flush 300 including a fill valve 302 and a flush valve 304 constructed in a unitary structure. Flusher 300 is actuated by actuator 306. Flush valve 304 includes a bias spring 310, which keeps a housing half 320 mounted by struts 322 on the flush conduit 316 forms a pressure chamber 324 above the valve member 312. Pressure chamber 324 includes a cylinder 26 within which a piston portion 28 of the valve member 312 is slideable. Chamber 324 is ordinarily under pressure because of fluid communication that a pressure line 330 provides between it and a pressurized-water supply connected to passage 448. When that pressure prevails, it holds the valve member 312 in a seated position.

Pressure chamber 324's pressure ordinarily prevails because a pilot-valve diaphragm 332 secured in housing half 320 by a pilot-valve cap 333 ordinarily cooperates with the valve member's seal ring 334 to prevent escape of pressurized water from the chamber. The pilot-valve diaphragm 332 is resiliently deformable, so the pressure that prevails within chamber 324 would tend to lift it from engagement with a pilot-valve seat 336 and thus allow pressure relief if a similar pressure did not prevail within a pilot chamber 338 and act on the diaphragm 332 over a greater area. The reason why this pressure prevails within the pilot chamber 338 is that a small orifice 340 through which a pilot-valve pin 342 formed by cap 333 extends permits water to bleed (through a relatively high flow resistance) into the pilot chamber. Thus, valve member 312 remains in the seated position (not shown) between flushes.

Figure 6B:
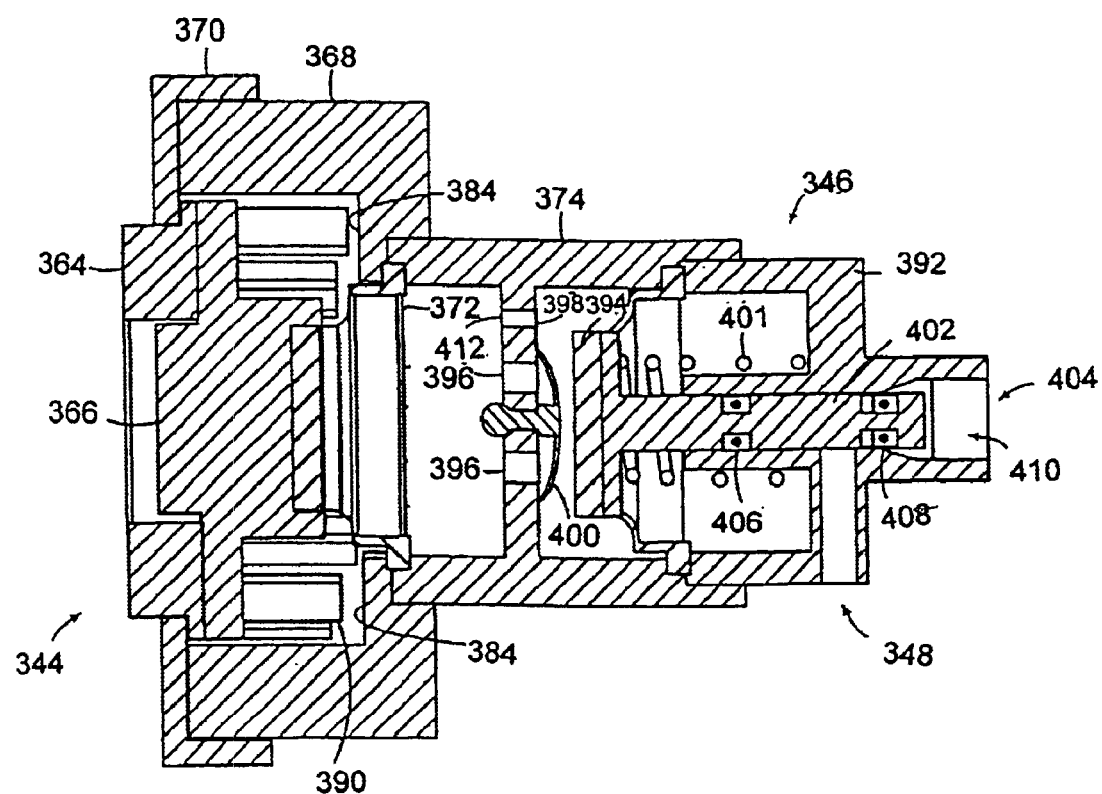
FIG. 6B is a cross-sectional view of a remote actuator valve and push button.

To cause the system to flush, the user depresses a push button 344 (FIG. 6B). As will be explained in more detail below, this causes a remote pressure-relief valve 346 to permit flow to its outlet 348 from a pressure-relief tube 350 secured at its other end by a fitting 352 to a plug member 354 mounted on cap 333. This places remote valve 346's outlet 348 in communication with a plug member 354's interior passage 356 (FIG. 6 and 6A and thereby with the pilot chamber 338 through passage 358. This relieves pressure in that chamber. The flow resistance of the path is much lower than that of the bleed orifice 340, by which the pilot valve's pressure is replenished, so the pressure within chamber 338 drops and permits pressure chamber 324's pressure to raise diaphragm 332 off its seat.

Diaphragm 332 permits the pressure within the pressure chamber 324 to be relieved through a plurality of openings such as opening 360. As a consequence, the bias spring 310 can overcome the force exerted by the now-reduced pressure within chamber 324. The flush-valve member 312 therefore rises to its open position (FIG. 6A), lifting its O-ring seal 362 off the main valve seat 314 and thereby allowing water from the bank to flow out through the flush conduit 316.

The user typically doesn't keep the push button 344 depressed long enough for the required flush volume to flow from tank 16 to the toilet bowl. However, remote valve 346 nonetheless remains open long enough. Referring to FIG. 6B, push button 344 actually is a compound button consisting of outer and inner button members 364 and 366 held in a button frame 368 by a button cap 370. A flexible diaphragm 372 secured to button frame 368 by an actuator-chamber housing 374 biases inner button 366 to the illustrated rest position, in which it additionally holds the outer button member 364 in its rest position.

Figure 6C:
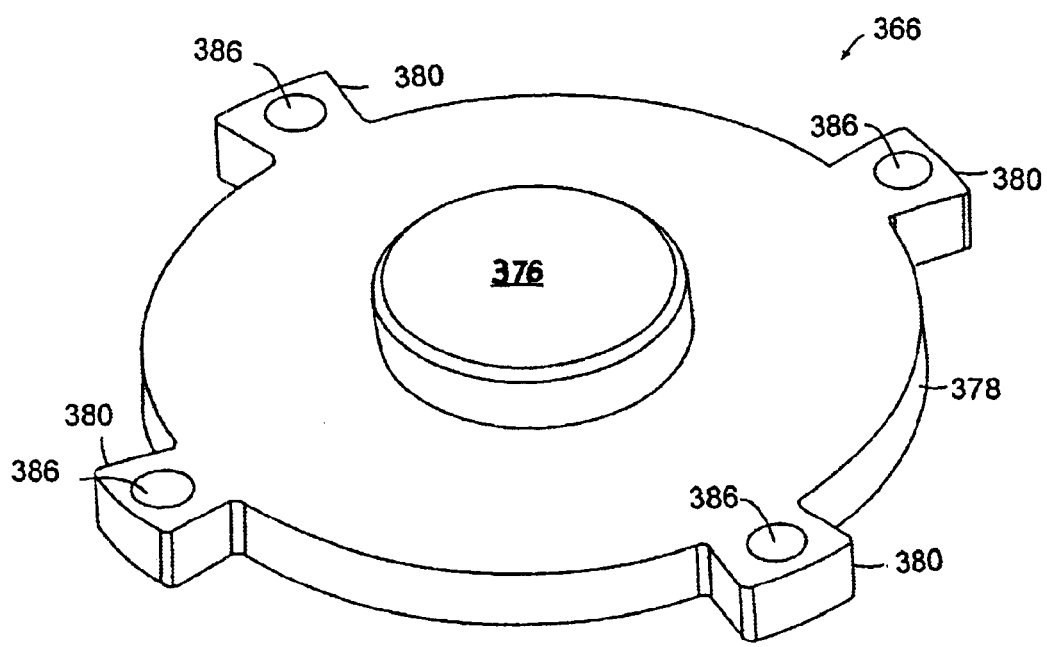
FIG. 6C is a top isometric view of one of the push-button members in the push-button assembly of FIG. 3.
Figure 6D:
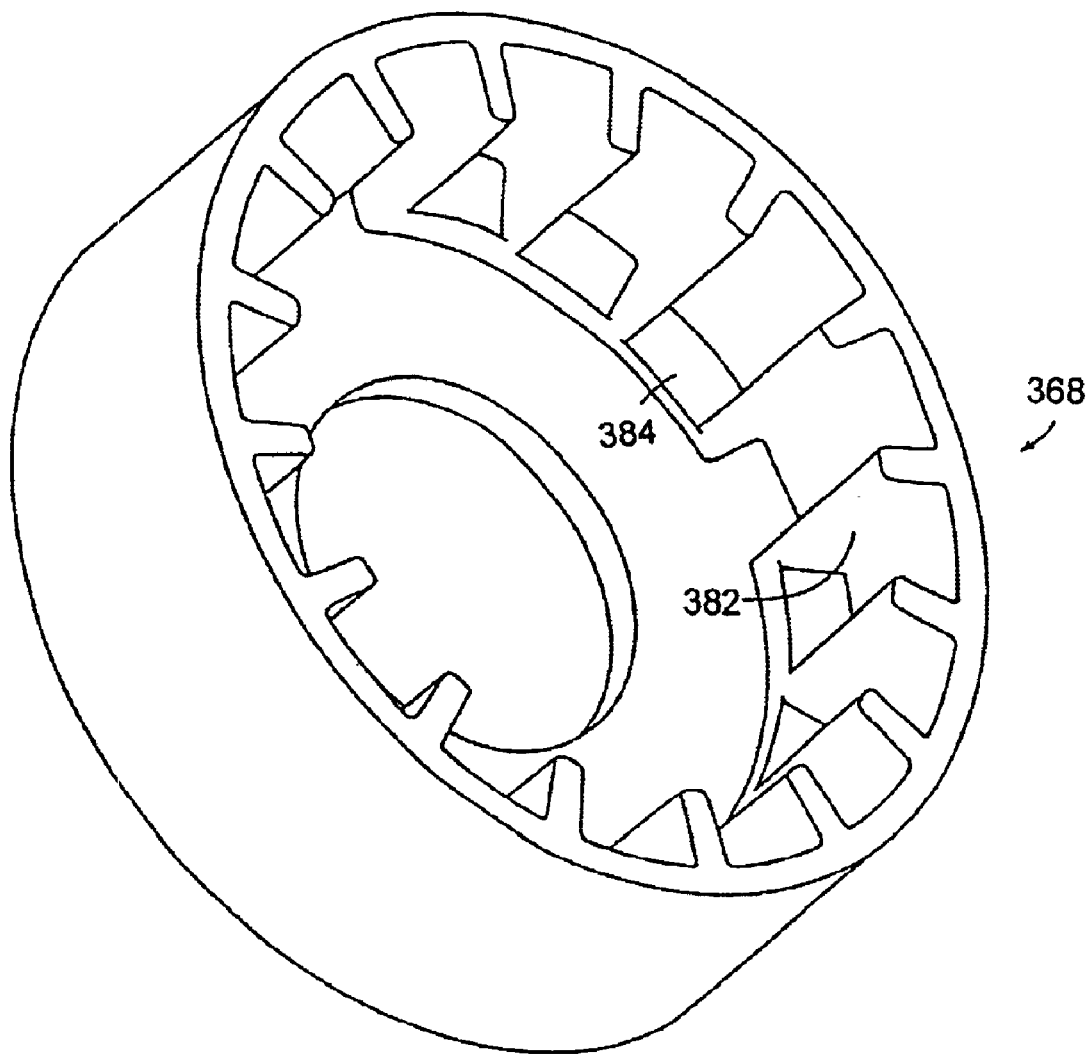
FIG. 6D is an isometric view of the button frame in FIG. 3's push-button assembly.
Figure 6E:
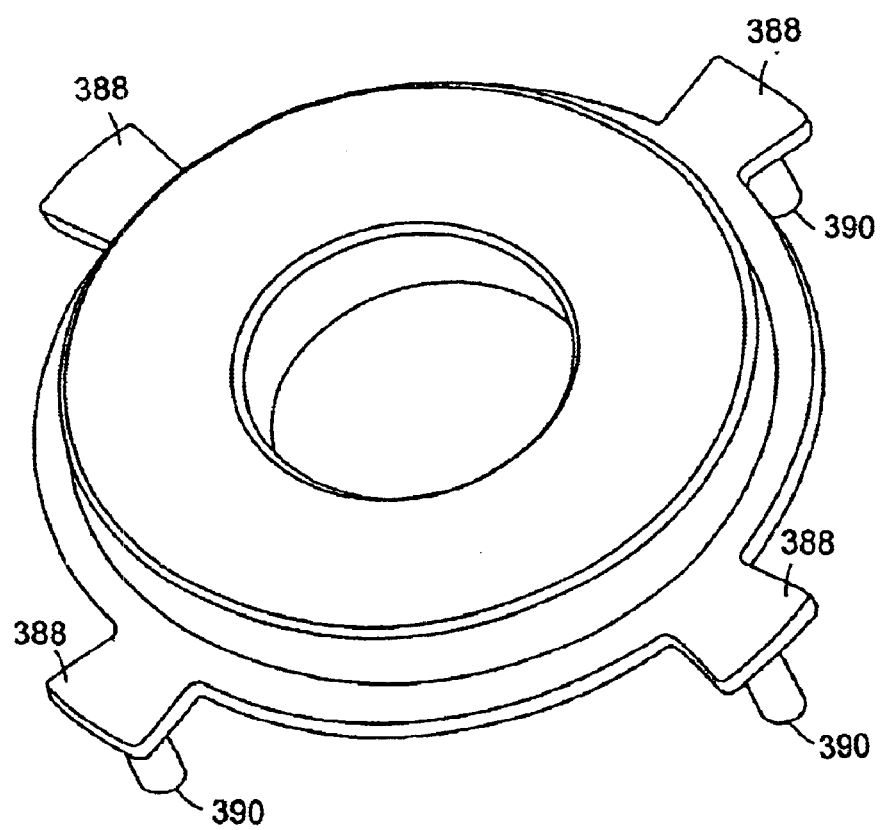

FIG. 6C is a top isometric view of inner button member 366 co-operatively arranged with outer button member 364, shown in FIG. 6E. Button member 366 includes a central land 376 extending from a generally disk-shaped layer 378 from which four keys 380 extend radially. Button frame 368 (FIG. 6D) forms a set of sixteen partitions 382 extending radially inward. Those partitions 382 cooperate to define sixteen key guides, within any four of which keys 380 can slide. The button frame 368 also forms stop surfaces 384 at the bases of the key guides thus formed. The stop surfaces 384 in the key guides occupied by the four keys at any one time are all arranged at the same level so that they stop all four keys simultaneously. However, different sets of four stops are disposed at different levels so that placing the keys in different sets of the key guides results in different amounts of permitted button travel.

Referring again to FIGS. 6C and 6E, each of the four keys 380 includes a passage 386 therethrough. Outer button member 364 is generally annular but forms four radially extending tabs 388 from which respective legs 390 extend. Legs 390 register with passages 384 in a sliding arrangement shown in FIG. 6B.

When the user operates push button 344, he most often presses against outer button member 364 and thereby depresses that member until its legs 390 reach the respective key guides' stop surfaces. Outer button member 364 bears against inner button member 366 (moving it to the right in FIG. 6B causing it to deform flexible diaphragm 372 from its illustrated position, to which it is biased). A valve housing 392 secured to the actuator-chamber housing 374 holds in place a second flexible diaphragm 394, which cooperates with diaphragm 372 and actuator-chamber housing 374 to form an actuator chamber. The actuator chamber is filled with an incompressible fluid, and button member 366's deformation of diaphragm 372 forces the fluid through four angularly spaced openings 396 in a divider wall 398 that the actuator-chamber housing 374 forms. In flowing through openings 396, the fluid lifts the lip of an umbrella-type check-valve member 400 snap-fit in a central divider-wall opening.

Referring still to FIG. 6B, umbrella-type check valve 400 and openings 396 are designed for fast expulsion and slow return of ejected fluid. The fluid's motion urges diaphragm 394 against the force of a bias spring 401 and thereby pushes to the right a valve member 402 slidably disposed in a valve channel 404 formed by valve housing 392. Valve member 402 forms two annular recesses in which respective O-ring seals 406 and 408 are disposed, and rightward motion causes O-ring 408 to extend into a widened portion 410 of channel 404 and thereby break the seal that it had theretofore maintained with the channel wall. Pressure theretofore prevailing in tube 350 is thereby relieved through channel 404 and outlet passage 348. When the user depresses only the outer button member 364, the point at which that member's legs 390 encounter their respective lands 384 determines how far into the widened channel portion 410 valve member 402 extends.

When the user releases button, flexible diaphragms 372 and 394 tend to resume the rest positions to which spring 401 biases them, so they act to return the valve 346 to its closed state. To resume the rest positions, they must move the actuator chamber's fluid back through the dividing wall 398. But check valve 400 prevents fluid from flowing through openings 396, and the only route through the wall that remains is therefore a bleed orifice 412, which imposes significant flow resistance and therefore a delay between the user's releases of the button and valve 346's closure.

The duration of the delay depends on the amount of diaphragm deformation that occurred, and this in turn depends on how far button member 364 traveled. The amount of that travel is determined by the selection of the key guides into which that button member's keys 380 were placed; different-level stop surfaces 384 result in different amounts of travel of legs 390 before they encounter those stop surfaces, but the resultant delay is usually at least two seconds.

The delay imposed as a result of the user's depressing only the outer button member 364 is usually so selected as not to permit the tank to empty completely but still to permit enough flushing flow for most purposes. If the user desires a fuller flush, he instead depresses the inner button member 366's land 376 (FIG. 6C). Button member 366 can travel farther than member 364; it can travel until its keys 380 reach respective stop surfaces 384. As a consequence, its operation causes more of the incompressible fluid to flow through the divider wall 398, and it thus requires more of the fluid to return upon the button's release before the valve 346 returns to its closed position. More of the tank's contents therefore flow into the toilet bowl to flush it.

Figure 7A:
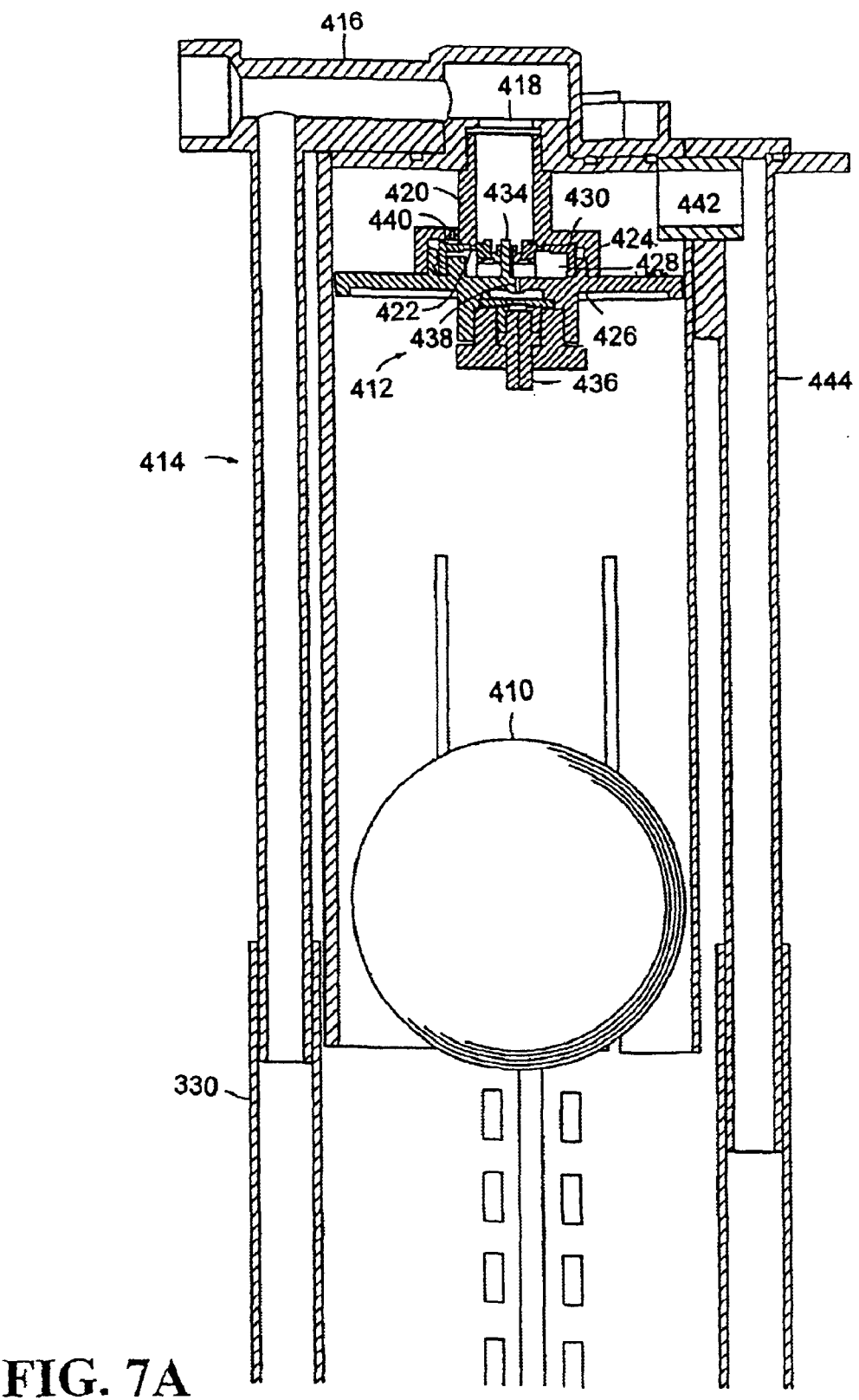
FIG. 7A is a more detailed cross sectional view of FIG. 6's float-valve assembly and FIG. 7B is a cross-sectional view of the flush-valve assembly showing a fill tube and a flow diverter.
Figure 7B:
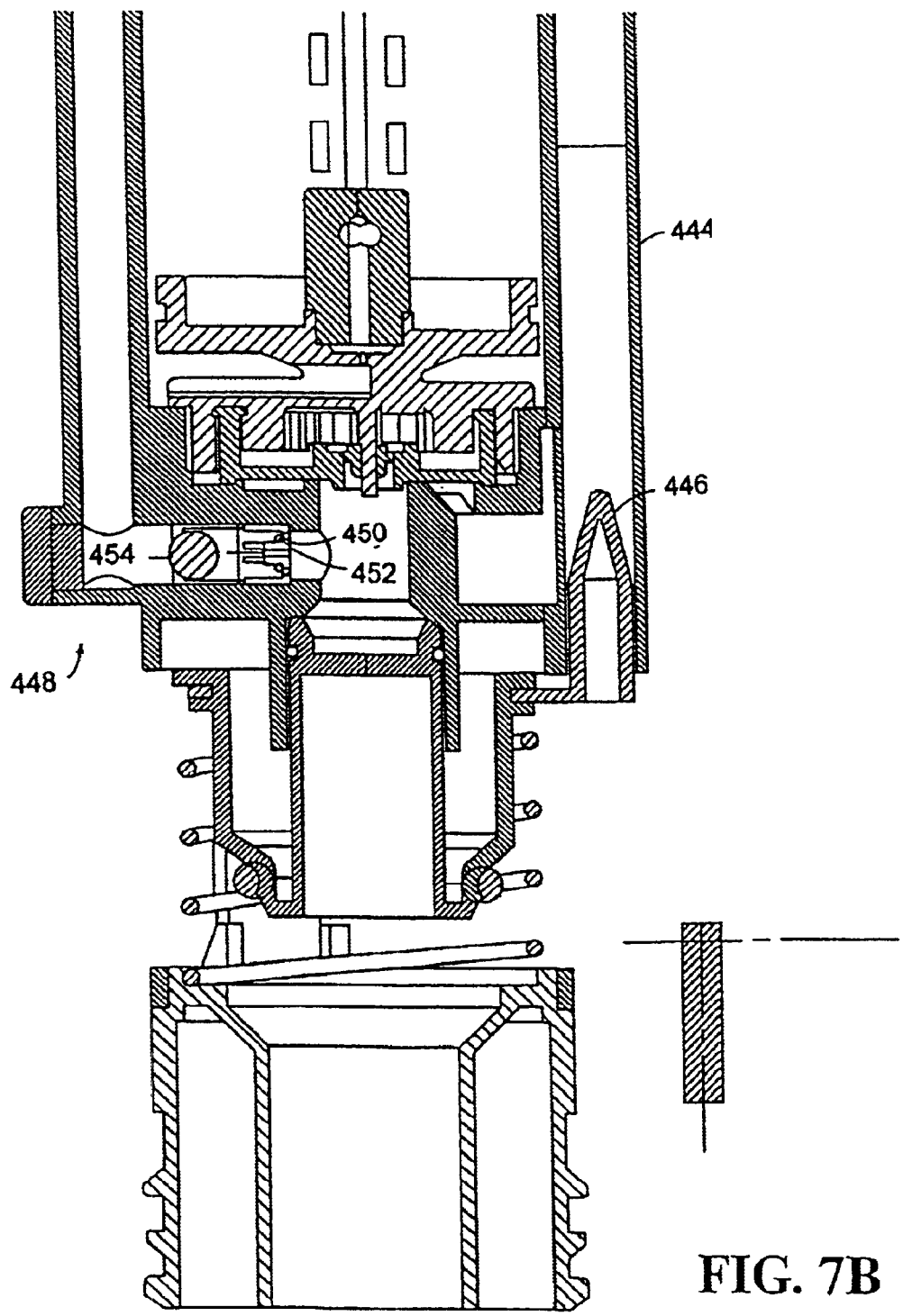

FIGS. 7A and 7B provide an enlarged view of flusher 300. When the water level in the tank has fallen significantly below a full-tank level, a freely floating float 415 (FIG. 7A) permits float valve 413 to open. That valve is mounted in an upper main-housing half 414 supported on the lower main-housing half. The main housing is provided in two halves so that the float-valve assembly 413's height, and thus the level to which the tank is allowed to fill, can be adjusted by means not shown.

A main pressure-inlet manifold 416, which feeds the conduit 330 by which pressure chamber 324 is pressurized, forms a further outlet 418. Through this outlet it feeds a conduit 420 mounted on the upper main housing half 414 and forming at its lower edge a float-valve seat 422. Formed integrally with the conduit 420 is a generally annular mouth portion 424 in which a pilot-chamber base 426 is threadedly secured. That base cooperates with the conduit 420's mouth portion 424 to form a float-valve pilot chamber 428 and secure within it a resiliently deformable float-valve diaphragm 430 that tends to seal against the float-valve seat 422. However, a bleed orifice in which is disposed a positioning pin 434 formed by the pilot-chamber base 426 permits fluid from the conduit 420 to enter the pilot-valve chamber 428. When a pilot-valve member 436 is held by the float 415 against the outlet of a pressure-relief passage 438, the pressure in the pilot-valve chamber 428 can build up to equal the pressure in the conduit 420 and, prevailing over a larger area than the pressure from the conduit 420, hold the float-valve diaphragm 430 seated so that it prevents the liquid in conduit 420 from flowing around the float-valve seat 422 through mouth-portion openings 440 and a port 442 to a tank-fill tube 444.

Referring still to FIG. 7A, when the tank level is low float 415 does not stop pressure-relief passage 438, so pressure in the pilot-valve chamber 428 is relieved faster than it can be restored through the bleed orifice 440. The pressure in conduit 420 therefore unseats the float-valve diaphragm 430, so water from conduit 420 can flow into the fill tube 444.

Fill tube 444 is designed for filling the tank, and the tank-filling flow tends to reduce the manifold pressure (i.e. line pressure). Since that pressure is what closes the flush valve, significant tank-filling flow might impair that valve's closing performance. Therefore, there is a flow restrictor 446 so that when the flush-valve member 312 is in its fully unseated position, water cannot flow at any significant rate from the fill tube 444 into the tank. Flow restrictor 446 is mounted on the flush-valve member and protrudes into the fill tube's outlet as to restrict the tube's flow area greatly. This has the beneficial effect of maintaining high pressure in the manifold 416 and thus the pressure line 330 by which, through bleed orifice 440, the manifold pressure closes the pilot valve and thus imposes on the flush valve the pressure that closes it. In other words, the flow restrictor ensures that there is enough pressure to close flush valve 304 with significant speed. When flush valve 304 does close, it retracts flow restrictor 446 from the fill tube 444 and thereby allows the tank to fill rapidly.

The flow-restrictor operation just described tends to make the flush valve's operation more predictable in duration than it would otherwise be; tank filling does not adversely affect the pressure that operates to close the flush valve. However, the pressure from the water source can vary, and this, too, could result in undesired variations in the delay between the remote valve's closing and that of the flush valve. Referring to FIG. 6, flush valve 304 includes a flow-rate controller 448 interposed in the flow path by which the flush-valve-closing pressure is supplied. The particular type of flow controller 448 is not critical, but FIG. 7B depicts one of the deformable-ring variety. A flow restrictor 450 disposed in the conduit cooperates with a resiliently deformable ring 452 to restrict the flow area through which pressurized water must flow to enter the pressure chamber that applies the closing force to the flush valve. If the supply pressure is relatively low, it does not greatly deform the ring, and the resultant flow area is relatively great: the already-low pressure is not reduced much in flowing through the restrictor. If the supply pressure is high, on the other hand, it deforms the ring by a greater amount and thereby restricts the flow area more significantly. So a greater pressure drop from the originally high pressure occurs. The flow-rate controller therefore reduces the pressure variation that the flush valve would otherwise experience. This reduces variation in the speed at which the flush valve closes.

Plumbing installations can experience not only pressure variation but also total pressure loss. In the absence of the present invention, such a pressure loss would permit the flush valve to open, causing an unintended flush. But a check valve 454 is provided in pressurizer conduit 330 so that the pressure holding the flush valve closes not lost when the line pressure is.

Figure 8:
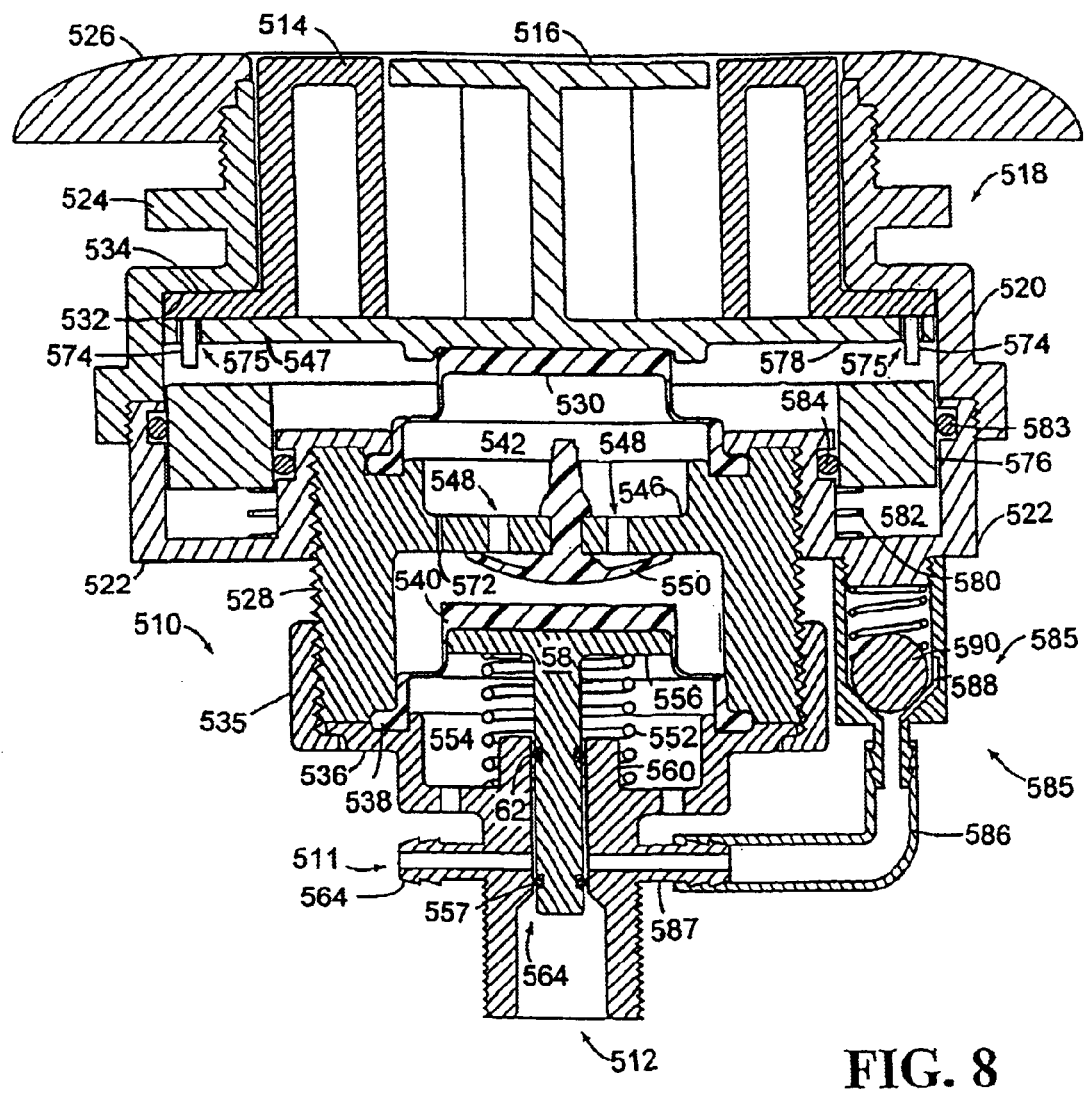
FIG. 8 is a cross-section of a valve that employs the present invention's teachings.

FIG. 8 illustrates another embodiment of a remote actuator used with flusher 300. Remote actuator 500 includes a valve 510, which controls flow from its inlet 511 to its outlet 512. The user depresses a push button 513 to open valve 510. The user typically will not keep the button depressed long enough for the required flush volume to flow. But the valve 510 nonetheless remains open long enough, as will now be explained.

In the illustrated embodiment, push button 513 actually is a compound button consisting of outer and inner button members 514 and 516. Those button members are disposed within an operator housing 518 that includes an outer housing member 520 and an inner housing member 522 threadedly secured to it. The outer housing member 520 forms a flange 524 that cooperates with an end cap 526 to secure the valve assembly to some support such as a toilet-tank wall. An actuator frame 528 is threadedly secured to the inner operator-housing member 522 and cooperates with it to clamp a flexible diaphragm 530 into position. Flexible diaphragm 530 urges the inner button member 516 upward in FIG. 8, but a knee 532 that the outer operator-housing member 520 forms so engages a shoulder 534 formed by the outer button member 514 as to retain the inner button member 522 within the housing.

A nut 535 that threadedly engages the actuator housing 528 secures a valve housing 536 to the actuator housing 528 and thereby clamps into a fixed position an annular lip 538 formed at the end of a second flexible diaphragm 540. Together with the actuator housing 528, the first and second flexible diaphragms 530 and 540 form an actuator chamber divided into first and second chamber segments 542 and 544 separated by a divider wall 546 that the actuator housing 528 forms.

The inner and outer button members 516 and 514 are so sized that a user depressing button 513 will ordinarily depress the outer button member unless he takes care to concentrate on the inner member only. When the outer button member 514 is depressed, it in turn presses down on the inner members plate portion 547, and this causes the first flexible diaphragm 530 to deform in such a manner as to reduce the volume of the first chamber segment 542. But the actuation chamber that segments 542 and 544 form is filled with an incompressible fluid such as distilled water, and a reduction in the first chamber segment 542's volume causes the second segment 544's volume to increase. Specifically, the incompressible fluid flows from the first chamber segment 542, through openings 548, past the lips of a flexible check-valve member 550, and into the second chamber segment 544. As a result, the second flexible diaphragm 540 deforms downward: the second chamber segment grows in volume.

This deformation of the second flexible diaphragm 540 occurs against the force of a compression spring 552, which is disposed within a spring chamber 554 that the second flexible diaphragm 540 cooperates with the valve housing 536 to form. That spring bears against an actuator head 556 that in turn bears against the second flexible diaphragm 540 to bias it into the illustrated position. In that position, an O-ring 557 mounted on the actuator's shaft 58, which is disposed within a guide 560 that the valve housing 536 forms, keeps water in the inlet 511 from flowing to the outlet 512. A second O-ring 562 prevents inlet water from flowing into the spring chamber 554. The just-explained downward deformation of the second flexible diaphragm 540 in response to a user's pressing the push button moves the lower O-ring 557 into an expanded region 564 and thus breaks its seal. This permits flow from the valve inlet 511 to the valve outlet 512.

When the user releases the push button, spring 552 causes the second flexible diaphragm 540 to return to the illustrated rest state. For that return to occur, the incompressible fluid has to flow back from the second chamber segment 544 to the first chamber segment 542. Check-valve member 550 prevents that return flow from occurring through the low-flow-resistance path that the relatively large divider-wall openings 548 provide. Instead, the returning fluid must all flow through a small divider-wall bleed orifice 572, so the return flow is slow, requiring at least two seconds before the actuator shaft 58 can reach a position in which the lower O-ring re-seals against the guide 560's wall and again prevents main valve flow.

Of course, the actual closure delay depends on the orifice size, the incompressible fluid's viscosity, and the actuation-chamber size. But it additionally depends upon the degree of deformation from which the flexible diaphragms need to recover, and this in turn depends on the length of button travel. When the user pushes the outer button, outer-button legs 574 move downward through plate-portion holes 575 until they meet a stop surface provided by an annular stop member 576. The distance from legs 574's rest position to the position of the stop member 576 thus determines the button travel when the user pushes the outer button member. If the user instead pushes only on the inner button member, though, that button member can travel a little farther, since it does not stop until the inner button member's plate portion 547 encounters stop member 576. This feature of enabling the user to choose between closure delays is of particular utility when the valve controls toilet flushing; pressing the outer button results in a normal flush, while pressing only on the inner button results in a fuller flush. In both cases, it is the stop member 576's position that determines the button travel and thus the closure delay.

Stop member 576's position depends in turn on the valve's inlet pressure, as will now be explained. The inner operator-housing member 522 and the stop member 576 cooperate with a tension spring 580, which is secured to them, to form a resiliently expandable stop. The stop defines an internal stop chamber 582, which O-rings 583 and 584 seal. A check valve 585 allows fluid to flow from a pressurizer conduit 586 into chamber 582 from a pressurizer port 587. That port communicates with the inlet 511 by way of the clearance between the actuator shaft 58 and the actuator guide 560's wall. Pressure at the valve inlet 511 thus can pressurize the stop chamber 582. The tension spring 580 tends to urge the stop member 576 toward the inner operator-housing member's lower end and thereby reduce the stop chamber's size. But the force that the inlet pressure exerts on the stop member 576 acts against the spring force and thus tends to expand the expandable stop.

The degree of stop expansion depends on the inlet pressure: the greater that pressure is, the more the actuator stop expands. Greater stop expansion results in the button travel's being more limited and thereby in less delay before the main valve closes. This shorter closure delay tends to compensate for the greater main-valve flow rate that a higher pressure causes. That is, it reduces pressure-caused variations in the volume of liquid that a single push-button operation allows to pass through the main valve.

Now, the outlet pressure typically undergoes a sudden reduction when the user operates the valve and thus permits flow from the valve inlet 511 through the valve outlet 512. But the pressurizer check valve 585, which readily permits fluid flow from the valve outlet 512 through the pressurizer conduit 585 to the stop chamber 582 to pressurize it, retards flow through conduit 586 in the other direction. It thereby tends to keep the stop expanded to the size that the inlet pressure dictated before the valve was opened. So the stop remains expanded throughout the duration of a closure delay, i.e., throughout the time when the valve is open. The stop chamber pressure will nonetheless adjust to inlet-chamber pressure reductions that occur while the valve is closed, because a bleed slot 588 formed in the valve member 590's seat permits depressurization over a longer time scale. Other embodiments may instead provide a bleed passage 591 through the valve member rather than around it.

Although, for the sake of simplicity, FIG. 8 depicts the stop member 576 as providing a single-level stop surface, it may be advantageous to have it provide several levels of stop surface so that a choice of closure-delay range can be made while the valve is being assembled or installed. A stop member such as FIG. 8A's stop member 576' may be employed for this purpose. That stop member is provided with a generally cylindrical extension 594, from which partitions 596 extend radially inward to form key ways 598. FIG. 8B, which is a stop view of the valve assembly with its end plate 526 and outer operator-housing member 520 removed, show that the outer button in such an embodiment forms keys 602 that fit into four key ways spaced by equal angles from each other. As FIG. 8C shows, the inner button similarly forms keys 604 that fit into those key ways.

Figure 8A:
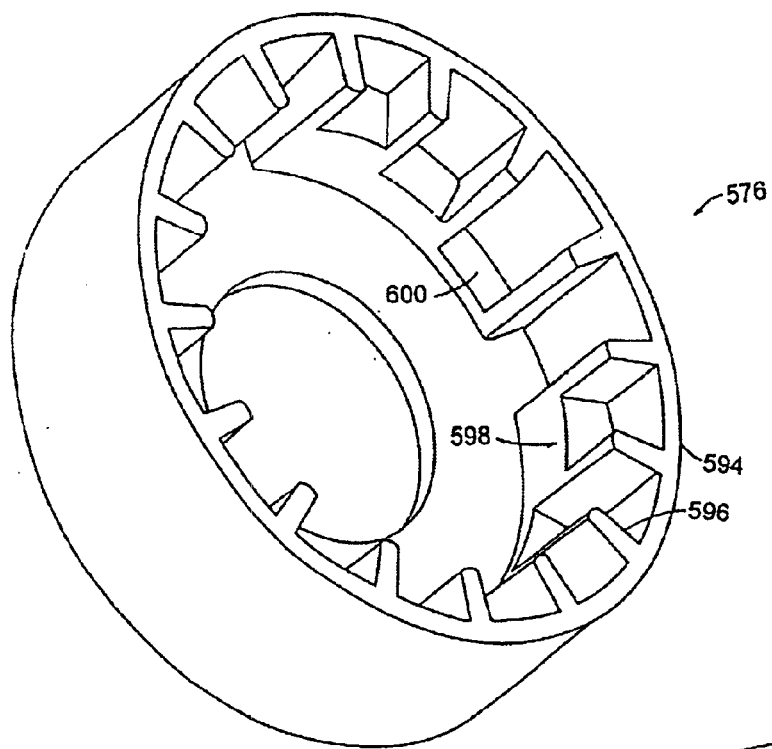
FIG. 8A is an isometric view of a stop member employed in an alternative embodiment of the present invention.
Figure 8C:
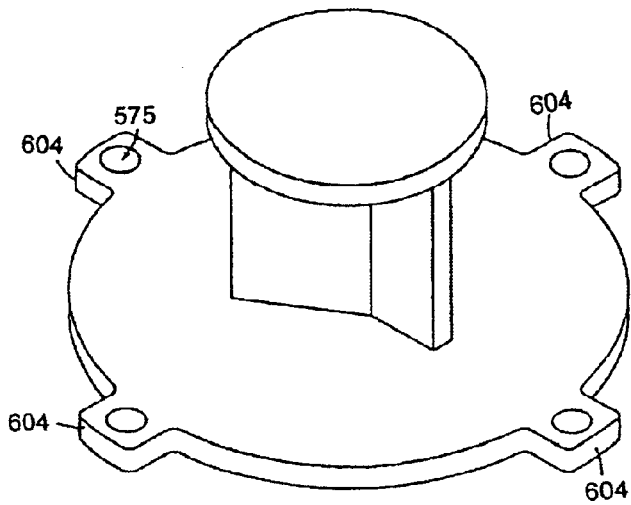
FIG. 8C is an isometric view of the inner button member employed in the FIG. 8A embodiment.
Figure 8B:
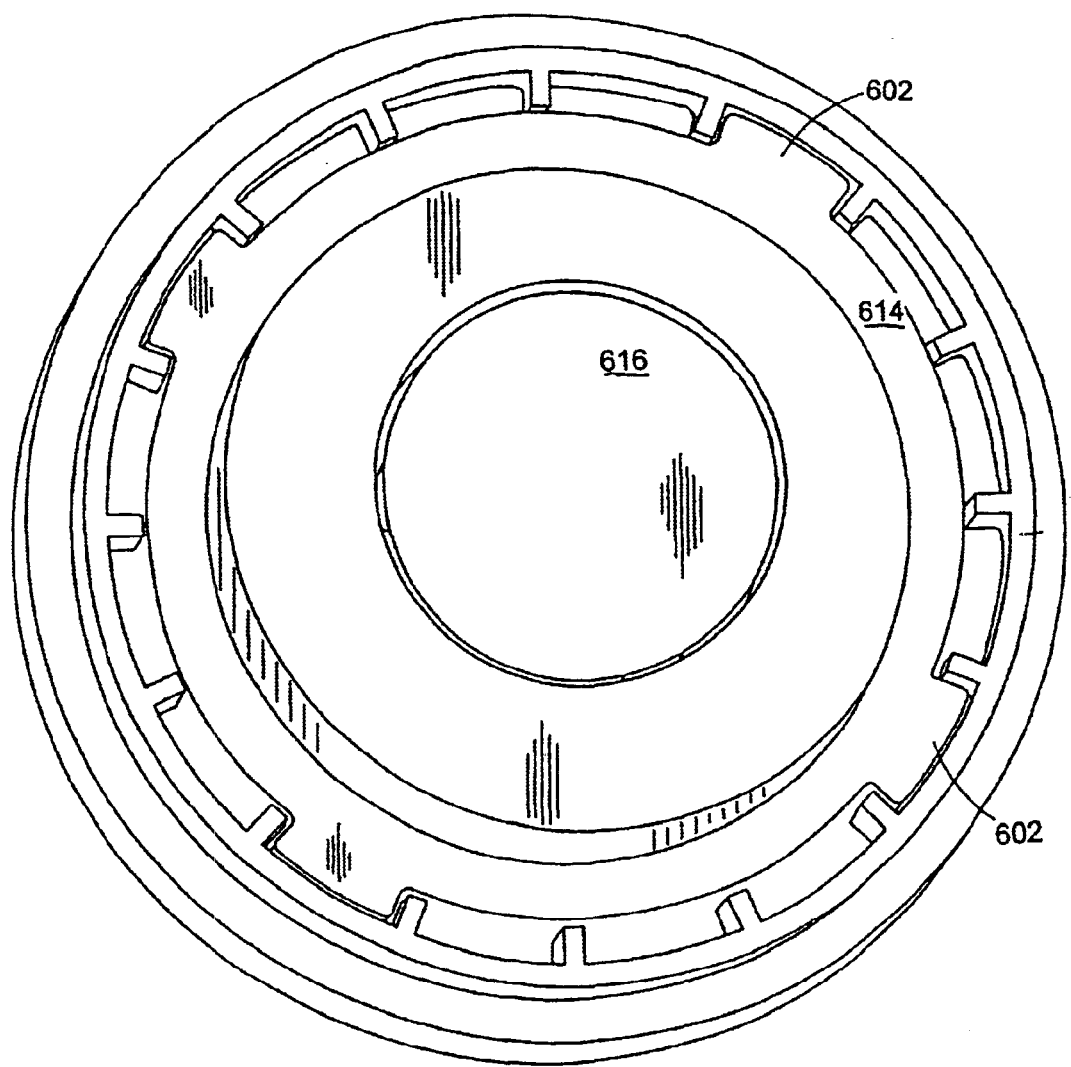
FIG. 8B is a plan view of the FIG. 8A embodiment with parts removed.

FIG. 8A shows that the different key ways have different-height stop surfaces 600. The heights repeat so that each key in any set of four key ways spaced by 90° from each other, such as the set that keys 604 of FIG. 8C occupy, have the same height. When the button is assembled, the assembler chooses the closure-delay range by selecting the 1st of four key ways into which he inserts the outer-button and inner-button keys 602 and 604.

Having described various embodiments and implementations of the present invention, it should be apparent to those skilled in the relevant art that the foregoing is illustrative only and not limiting, having been presented by way of example only. There are other embodiments or elements suitable for the above-described embodiments, described in the above-listed publications, all of which are incorporated by reference as if fully reproduced herein. The functions of any one element may be carried out in various ways in alternative embodiments. Also, the functions of several elements may, in alternative embodiments, be carried out by fewer, or a single, element.

What is claimed is:

1. A tank-type flusher, comprising:
    an intake valve connected to an external water source and constructed to close water flow to a water storage tank at about a predefined water level in said water tank;
    a flush valve constructed to control position of a flush valve member movable between a seated state and an unseated state allowing water discharge from said water tank into a toilet bowl; said flush valve member being biased to said unseated state by a bias member and being forced to said seated state by at least a portion of water pressure from said external source; and
    a housing constructed to enable an adjustable distance between said intake valve and said flush valve.

2. The tank-type flusher of claim 1 wherein said housing includes two halves for enabling said adjustable distance.

3. The tank-type flusher of claim 1 wherein said flush-valve member is arranged to receive a water pressure from said external source and is arranged to prevent said water discharge utilizing at least a portion of said water pressure.

4. The tank-type flusher of claim 1 wherein said flush valve member includes a diaphragm-operated flush valve that is controlled by a solenoid.

5. The tank-type flusher of claim 1 wherein said water tank is an exposed water tank.

6. The tank-type flusher of claim 1 wherein said water tank is a concealed water tank located behind a wall.

7. The tank-type flusher of claim 1 wherein said intake valve enables a variable water level in said tank.

8. The tank-type flusher of claim 1 including a vacuum breaker arranged to prevent transfer of water from said tank to a water supply.

9. The tank-type flusher of claim 1 including a manual actuator constructed and arranged to actuate said flush valve.

10. The tank-type flusher of claim 9 wherein said manual actuator is a push button actuator.

11. The tank-type flusher of claim 10 wherein said push button actuator is constructed to actuate said flush valve enabling a dual water volume flush.

12. The tank-type flusher of claim 10 wherein said push button actuator is constructed to actuate hydraulically said flush valve.

13. The tank-type flusher of claim 1 including an automatic actuator constructed and arranged to actuate said flush valve.

14. The tank-type flusher of claim 13 wherein said automatic actuator is constructed to be triggered by a sensor.

15. The tank-type flusher of claim 14 wherein said sensor registers presence of an object.

16. The tank-type flusher of claim 14 wherein said sensor registers movement of an object.

17. The tank-type flusher of claim 14 wherein said sensor is an optical sensor.

18. The tank-type flusher of claim 13 wherein said automatic actuator is constructed to actuate said flush valve enabling a dual water volume flush.

19. The tank-type flusher of claim 13 wherein said automatic actuator is located outside of said water tank and is constructed to actuate hydraulically said flush valve.

20. The tank-type flusher of claim 1 including a check valve arranged to reduce variation of closing pressure depending on water line pressure.

21. The tank-type flusher of claim 1 including a pressure compensated flow regulator.

22. The tank-type flusher of claim 1 including a wiper seal co-operatively arranged with said flush valve to seal water inside said water tank and prevent water leaking into said toilet bowl in the closed state.

23. The tank-type flusher of claim 1 including a vent for controlling odor.

24. A tank-type flusher, comprising:
- an intake valve constructed to close water flow from an external water source to a concealed water storage tank when there is a predefined water level in said water tank, said water storage tank being located behind a wall, said intake valve including a float constructed and arranged to float substantially linearly depending on a water level in said water storage tank; and
- a diaphragm-operated flush valve including a flush-valve chamber, said diaphragm-operated flush valve being constructed to open upon actuation to discharge water into a toilet bowl from said water tank and a housing constructed to enable an adjustable distance between said intake and said flush valve.

25. A tank-type flusher, comprising:
- an intake valve constructed to close water flow from an external water source to a water storage tank when there is a predefined water level in said water tank, said intake valve including a float constructed and arranged to float substantially linearly depending on a water level in said water storage tank, wherein said intake valve enables a variable water level in said tank; and
- a diaphragm-operated flush valve including a flush-valve chamber, said diaphragm-operated flush valve being constructed to open upon actuation to discharge water into a toilet bowl from said water tank and a housing constructed to enable an adjustable distance between said intake valve and said flush valve.

26. A tank-type flusher, comprising:
- an intake valve constructed to close water flow from an external water source to a water storage tank when there is a predefined water level in said water tank, said intake valve including a float constructed and arranged to float substantially linearly depending on a water level in said water storage tank;
- a pressure compensated flow regulator and
- a diaphragm-operated flush valve including a flush-valve chamber, said diaphragm-operated flush valve being constructed to open upon actuation to discharge water into a toilet bowl from said water tank and a housing constructed to enable an adjustable distance between said intake valve and said flush valve.

* * * * *